US012693886B2

(12) United States Patent
Boyer et al.

(10) Patent No.: US 12,693,886 B2
(45) Date of Patent: *Jul. 28, 2026

(54) CYBER SECURITY SYSTEM WITH CLOUD ARCHITECTURE FORMATION AND VISUALIZATION

(71) Applicant: Darktrace Holdings Limited, Cambridge (GB)

(72) Inventors: John Anthony Boyer, Cambridge (GB); Joseph Gardner, Cambridge (GB); Mihai Varsandan, Edinburgh (GB); Ciaran McKey, Cambridge (GB); Connor Trimble, Cambridge (GB); Jonathan Davies, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 17 days.

This patent is subject to a terminal disclaimer.

(21) Appl. No.: 18/400,625

(22) Filed: Dec. 29, 2023

(65) Prior Publication Data

US 2024/0297883 A1 Sep. 5, 2024

Related U.S. Application Data

(60) Provisional application No. 63/436,425, filed on Dec. 30, 2022.

(51) Int. Cl.
*H04L 9/40* (2022.01)
*G06F 9/455* (2018.01)
*H04L 41/16* (2022.01)

(52) U.S. Cl.
CPC .......... *G06F 9/45558* (2013.01); *H04L 41/16* (2013.01); *H04L 63/10* (2013.01); *H04L 63/1433* (2013.01); *G06F 2009/45587* (2013.01)

(58) Field of Classification Search
CPC ....... G06F 9/45558; G06F 2009/45587; H04L 41/16; H04L 63/10; H04L 63/1433; H04L 63/1425; H04L 63/20
(Continued)

(56) References Cited

U.S. PATENT DOCUMENTS 10,268,821 B2 4/2019 Stockdale
10,419,466 B2 9/2019 Ferguson
(Continued)

OTHER PUBLICATIONS

Karantzas et al. An empirical assessment of endpoint detection and response systems against advanced persistent threats attack vectors. Journal of Cybersecurity and Privacy 1.3 2021 387-421.
(Continued)

*Primary Examiner* — Meng Vang
(74) *Attorney, Agent, or Firm* — Rutan and Tucker, LLP

(57) ABSTRACT

A cyber security system is adapted to generate a cloud architecture assembled from a plurality of cloud resources within a customer cloud environment based on metadata associated with the plurality of cloud resources. The cyber security system features at least a plurality of components. The first component identifies the plurality of cloud resources and collects metadata associated with each of the plurality of cloud resources including a first cloud resource for storage within a storage subsystem. The second component determines how at least the first cloud resource of the plurality of cloud resources is behaving within the customer cloud environment based on analytics conducted on log data and network traffic data associated with the first cloud resource. The third component conducts analytics on information associated with the plurality of cloud resources in order to detect compliance or misconfiguration of the plurality of cloud resources forming the cloud architecture.

21 Claims, 18 Drawing Sheets

(58) Field of Classification Search
USPC ........................................................... 726/4
See application file for complete search history.

(56) References Cited

U.S. PATENT DOCUMENTS

| | | | |
|---|---|---|---|
| 10,701,093 B2 | 6/2020 | Dean | |
| 2007/0192474 A1* | 8/2007 | Decasper | H04L 67/306 |
| | | | 709/223 |
| 2014/0012959 A1 | 1/2014 | Round | |
| 2017/0270295 A1 | 9/2017 | Park et al. | |
| 2018/0241843 A1* | 8/2018 | Bardhan | G06N 3/084 |
| 2020/0225655 A1* | 7/2020 | Cella | G06F 18/2178 |
| 2020/0228565 A1* | 7/2020 | Reverte | H04L 63/1425 |
| 2020/0244673 A1 | 7/2020 | Stockdale | |
| 2021/0273958 A1 | 9/2021 | McLean | |
| 2021/0273960 A1 | 9/2021 | Humphrey et al. | |
| 2022/0014533 A1 | 1/2022 | Almaz et al. | |
| 2022/0156631 A1* | 5/2022 | Kanso | G06N 20/00 |
| 2022/0224724 A1 | 7/2022 | Bazalgette et al. | |
| 2022/0345483 A1* | 10/2022 | Shua | H04L 9/0825 |
| 2024/0012932 A1* | 1/2024 | Qiao | G06F 21/6245 |
| 2024/0028945 A1* | 1/2024 | Yadgaran | G06N 20/20 |
| 2024/0039927 A1* | 2/2024 | Narayan | G06F 21/577 |

OTHER PUBLICATIONS

International Searching Authority, "The International Serch Report and the Written Opinion of the International Searching Authority, or the Declaration"; Sep. 2023; 51 pages.

* cited by examiner

CYBER SECURITY SYSTEM WITH CLOUD ARCHITECTURE FORMATION AND VISUALIZATION

RELATED APPLICATION

This application claims priority under 35 USC § 119 to U.S. Provisional Patent Application No. 63/436,425, entitled "CYBER SECURITY SYSTEM" filed on Dec. 30, 2022, where the entire content of this application is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and embodiments of cloud environment analytics to gather metadata associated with cloud resource and cloud architectures for visualization of the cloud architectures.

BACKGROUND

Cybersecurity attacks have become a pervasive problem for an enterprise (e.g., any organization including a company, a corporation, a partnership, individual or group of individuals, etc.) as enterprise networks and their networked devices are too frequently subjected to attack and compromise. A "cyber security threat" (sometimes referred to as a "cyber threat") constitutes a threat to the security of a network and/or networked devices, such as an enterprise network providing interconnectivity to one or more networked devices. The cyber threat may originate from an external endpoint or an internal entity (e.g., a negligent or rogue authorized user). Also, cyber threats may represent malicious or criminal activity, ranging from theft of credential to even a nation-state attack, where the source initiating or causing the cyber threat is commonly referred to as a "malicious" source. For example, the cyber threat may be a cyber-attack against a network, networks devices, stored or in-flight data accessible over the network, or the like. This cyber-attack may involve malicious software introduced into a computing device or into the network.

The migration to the cloud has marked an extraordinary transformation for many enterprises, and more often than not, a monumental undertaking in providing cloud-based security for an enterprise. While cloud-native approaches have facilitated swift innovation and unrivalled scalability, the addition of cloud-based security has created increased network security complexities, especially in the detection of cyber threats. One reason is that network security teams tend to have significantly less insight into and comprehension of cloud environments and cloud workloads in comparison to their development team (DevOps) counterparts. Existing solutions fall short in providing the necessary level of visibility for those network security teams who understand the enterprise network, but are unfamiliar with its cloud resources.

Rather than merely cataloguing cloud resources for an enterprise based upon resource type as offered by conventional solutions from cyber security vendors, it would be advantageous to implement a cloud security system that identifies the cloud resources, recovers metadata (e.g., data, properties, metrics, etc.) associated with these cloud resources, and constructs one or more cloud architectures (hereinafter, "cloud architecture(s)") to represent interconnected cloud resources that may collectively operate in accordance with the same or similar policies for a specific function or purpose. The cloud architecture(s) may be rendered as a graphical representation of interconnected cloud resources to provide a holistic understanding of the enterprise's cloud environment. Also, accessing all components in the context of how they operate-pattern of life—is a core feature in securing an enterprise. This approach is fundamentally different than existing products offered by other vendors that simply identifying cloud resources for analysis in isolation.

SUMMARY

Methods, systems, and apparatus are disclosed for an Artificial Intelligence based (AI-based) enterprise security system. In general, the AI-based enterprise security system features a cloud security system communicatively coupled to a cyber security appliance. The cloud security system may be deployed as part of an on-premises (hereinafter, "on-prem") network to collect information pertaining to resources within a cloud environment utilized by an enterprise (hereinafter, "cloud resources"). The collection of the information associated with the cloud resources may be extracted from one or more cloud networks via a corresponding cloud provider application programming interface (API). Additional information pertaining to the cloud resources may be collected via sensors, logs, a specific cloud provider module, or the like. The cloud security system is configured to support an enterprise's security team by providing comprehensive visibility and an in-depth understanding of the enterprise's cloud environment.

According to one embodiment of the disclosure, the cloud security system is configured to perform cloud resource enumeration, resource property discovery, enhanced metric collection, and resource mapping to populate a data store with information (metadata) associated with cloud resources within a customer cloud environment. Thereafter, the cloud resource data store may be accessed to (i) formulate and render customer-based cloud architectures, (ii) determine misconfiguration and threat risk levels for the cloud resources and/or the cloud architectures, and (iii) perform machine-learning based (ML-based) analytics to identify potential cyber threats associated with the cloud resources and/or cloud architectures.

As an illustrative example, the cloud security system may be configured with a cloud resource enumeration component, a resource property discovery component, an activity metrics collection component, an enrichment metric collection component, a risk assessment component, an architecture creation component, and/or an architecture rendering component. These components collectively operate to detect cloud resources, acquire metadata associated with the cloud resources, formulate cloud architectures based on interconnectivity between these cloud resources learned from metadata acquired via the cloud provider API(s) and/or installed sensor(s). In addition to the acquisition of the metadata associate with the cloud resources for cloud architecture formation, the cloud security system is configured to identify cloud resource and/or architecture misconfigurations, determine cloud resource and/or architecture costs, and/or security risks for each cloud resource and cloud architecture.

More specifically, the cloud security system may identify different cloud resource types, namely any logical or physical element that defines or determines access within a cloud network. For example, one resource type may be directed to compute engines (e.g., AWS™ Elastic Compute Cloud "EC2", Azure® virtual machines, Google® compute engine, etc.). Other examples may include, but are not limited or restricted to databases, compute services (e.g., AWS™ Lambda™, Azure® Functions, etc.), firewalls, user profiles, user policies, data stores (e.g., AWS™ Simple Storage Service "S3", Azure® blob storage, etc.), virtual machines, or the like. In lieu of merely categorizing individual cloud resources, the cloud security system is further configured to contextualize these cloud resources by at least reconstructing these cloud resources into interactive, customer-specific cloud architectures that reflect the interconnectivity of cloud resources within cloud architectures operating within a customer cloud environment. This involves assessing all cloud resources in the context of how these cloud resources cooperate as a cloud architecture for "pattern of life" analytics.

Herein, prior to rendering interactive architectures for use by security teams, the workflow conducted by the cloud security system may be segmented into three phases: (1) discovery phase, (2) architecture formation phase, and (3) architecture reduction phase. These phases are performed once the customer has been authenticated and provided access to its cloud resources.

A. Discovery Phase

The cloud security system is configured to conduct resource enumeration in which the cloud resources are identified (e.g., by type, name, etc.). Thereafter, metadata associated with each of the cloud resources is gathered. The gathered metadata for each cloud resource may differ depending on its resource type. The metadata gathered for compute engine components (e.g., AWS™ EC2 instance, etc.) is different, at least in part, from the metadata gathered for a serverless computing platform such as AWS™ Lambda. For example, the metadata associated with an EC2 instance may include (i) an instance identifier, (ii) instance type, (iii) identifier for the Amazon® Machine Image (AMI) used to launch the instance, (iv) security group, etc. In contrast, the metadata associated with the Lambda function may include (i) function name, (ii) function version, (iii) function memory size, (iv) function timeout, etc.

As a result, the cloud security system enumerates all cloud resources present in the customer cloud environment using an API-based method. These cloud resources may include cloud components (e.g., compute engines, compute services, firewalls, user profiles, user roles, logical data stores, etc.), where metadata associated with the cloud resources may include policies directed to component access, firewall restrictions, and/or user policies. The cloud resources may also include network components (e.g., virtual private cloud networks "VPCs," VPC subnets, etc.). The identified cloud resources and their metadata are maintained within a data store.

Additional metadata associated with the cloud resources may be gathered. For instance, connectivity may be determined for each cloud resource to determine accessibility for each of these cloud resources. This may involve conducting analytics on user access to certain cloud resources, user roles, and/or user permissions, where the access analytics is used to identical logical relationships between the cloud resources sometimes referred to as "access paths." The access data and/or access paths for each of the cloud resources may be stored as additional metadata for that cloud resource.

Additionally, connectivity may involve analytics on policies associated with the network resources to determine communicative relationships between network components, which are referred to as "network paths." The network data and network paths may be mapped back to the cloud resources (network components being cloud resources), where the resultant data may be provided to the data store to augment metadata stored for these cloud resources.

Additionally, the cloud security system may be configured to uncover enrichment metrics, such as automatically identifying cloud security misconfigurations and compliance issues that may highlight potential cyber threats. Besides identifying misconfigurations and compliance issues for cloud resources and/or cloud architectures, the cloud security system is further configured to determine costs metrics and cyber threat risk levels associated with the cloud resource and/or cloud architecture generated from the cloud resources as described below.

According to one embodiment of the disclosure, the data enumeration phase involves operations to identify and gather metadata associated with the cloud resources within the customer cloud environment. Additionally, the data enumeration phase involves operations to gather additional data to provide context associated with the operability of these cloud resources, such as how the cloud resources operate within the customer cloud environment. This may involve the use vSensors, which are configured to receive network data through traffic mirroring, host-based sensors such as osSensors, and/or container (Kubernetes) sensors. The data enumeration phase may involve further operations to gather data associated with one or more logs, such as audit logs and/or flow logs for example. The network data and log data provide behavioral metadata to be stored with applicable cloud resources to provide context and a more holistic understanding of the resources within the customer cloud environment. The collective data, inclusive of the log data such as the audit log data and flow log data, is provided to a main cyber security system (e.g., AI-based cyber security appliance 120 of FIGS. 1A-1B below) for pattern of life analysis B. Architecture Formation Phase The cloud security system may be configured to conceptualize the enumerated cloud resources to connect cloud resources together to form a cloud architecture. The connection scheme may be based on the level of overlap of components between different cloud architectures and the sharing of similar policies and access controls between the cloud resources.

For example, an infrastructure might include a series of databases, a load balancer and other different resource types, where these components are conceptualized as a cloud architecture for database storage, where the cloud architecture may be subsequently analysed for misconfigurations as well as cost and risk assessment. As a result, each of the components, represented as individual nodes with a graphical cloud architecture representation when formed, may be associated with a (cyber threat) risk level. Also, each cloud architecture may be associated with a risk level.

Conducted concurrently with or after the discovery phase, the cloud security system is configured to generate graphical cloud architecture representations. Herein, each of the resources within the cloud architectures is represented as an interactive individual node, where certain metadata associated with each node may be accessible for visual review in response to selection of the resource.

The cloud security system is configured to construct one or more graphical representations of cloud architectures associated with the customer cloud environment. According to one embodiment, the cloud architecture may be graphically represented by identifying pseudo virtual private cloud (VPC) nodes that are seeded into the graph. Edges are drawn between nodes based upon various relationships such as (i) parent/child relationships (e.g., EC2 is in the VPC located in region A), (ii) ownership/containment relationships (VPC owns a "S3" data store), and/or (iii) traffic relationships (network policy permits traffic between two nodes).

As an illustrative example, the cloud security system is configured to connect nodes together by a series of edges. For serverless cloud resources, edges are also drawn between user entities and the resources they can impact—by role or be read/write permissions. Herein, for this example, the first edge type is based on a parent-child relationship. So, for this example, a subnet contains an EC2 instance, so that the EC2 instance is connected to a subnet with a parent-child relationship edge. Another edge type is based on an ownership/containment relationship. So, for this example, the EC2 instance might own a digital certificate such as a Secure Socket Layer (SSL) certificate that operates as a separate type of resource. Yet another edge type is based on a traffic relationship. Continuing this example, the EC2 instance may be configured to communicate with another EC2 instance because of a firewall policy. The nodes are interactive, where selection of the nodes representing a part of the graphical representation(s) may display metadata, such as properties and metrics associated with the node, including enhanced metrics such as a computed risk level and misconfigurations.

The generation of the node/edge representation may be determined through component inter-communication search logic. According to one embodiment of the disclosure, the component inter-communication search logic may begin from each VPC node associated with the cloud architecture. The search logic can start at a top (VPC) node, and then the search logic determines what components are communicatively coupled with the VPC. Thereafter, each of these components is considered part of a cloud architecture under analysis and presented on a user interface (UI) of the enterprise security system. Thus, the search logic attempts to traverse from the VPC node to as many cloud resources as possible-some edge types and some node types are marked as untraversable. Stated differently, the set of connected resources that result from the search logic analytics are considered a "cloud architecture"—an interconnected series of cloud resources that represent a discrete infrastructure or project. In an enterprise's overall cloud network, the cyber security system will produce these sets of discrete cloud architectures.

The risk metric may be computed for each cloud resource and cloud architecture. Firstly, during the discovery phase, the risk assessment component may be configured to assign a risk value to each cloud resource representing the likelihood of the cloud resource being susceptible to a cyber threat. The assigned risk value may be based on characteristics of the cloud resource, such as age, resource type, and even impact tags being a risk level assigned by the customer. Also, the scores for each cloud resource in the cloud architecture may be used to re-weight all connected resources.

Additionally, the risk assessment component may be further configured to assign a risk value to a set of cloud resources forming the cloud architecture, where the assigned risk value may be an average of an aggregate of risk values associated with each of the set of cloud resources.

Lastly, during the discovery phase, a misconfiguration determination logic may be configured to evaluate each cloud resource and/or cloud architecture for known misconfigurations. Hence, each misconfiguration influences operability of a cloud architecture as the misconfiguration risk value (e.g., the average misconfiguration risk value) is a parameter for use in generation of the cloud architecture risk value. The scores for each cloud resource may be used in re-weighting all connected resources.

For example, the cloud security system is configured to check the cloud resources for misconfigurations and determine whether one or more of these cloud resources is exposed to a public network (e.g., Internet). The cloud security system is further configured to check the misconfigured cloud resources (nodes) within a cloud architecture, and then, if one of these cloud resources features a risk level exceeding a prescribed risk value (risky), then the cloud security system may be requested to continue to use to raise a misconfiguration level of every connected node as well as the cloud architecture as a whole.

Thereafter, the risk values (scores) of each cloud resource in the cloud architecture is used to re-weight all connected resources. For example, the cloud security system may be configured to check the cloud resources for misconfigurations and determine whether one or more of these cloud resources is exposed to a public network (e.g., Internet).

Additionally, each node is evaluated for importance. For example, a list of types of resources in the cloud architecture can be maintained in a graphic data store to indicate relative importance of a resource, which might be more important than some other type of resources deemed a bit less useful or smaller in function. This importance may be done by type, or by computing some form of graph centrality within the context of the architecture. Finally, nodes are assessed for proximity/exposure to a publicly assessable network (e.g., Internet).

The summation of a misconfiguration value (score) and/or risk values (scores) are relied upon to generate a misconfiguration and/or risk levels of the cloud architecture. The misconfiguration score is summed for the architecture and weighted with the importance and proximity/exposure metrics. This is how the cybersecurity system generates a risk for the architecture and how the cloud security system may be configured to prioritize, for example, all types of alerts in the cloud security product based upon the riskiness of the architecture with which they are associated.

Note, the system enumerates and graphs what the architecture without a need for customer's seeding input. The system does not need the client to identify individual components in a cloud network (e.g., 3 EC2s, this database, this DNS server, etc.). The system can automatically compute the cost and risk metrics. Also, a user interface provides the customer with the ability to add or remove cloud resources, and therefore nodes, after the could architecture has been generated.

The cloud security system is ingesting the existing risk values (scores) for these resources, if we have seen them in the existing cyber security appliance that relate to the discrete cloud network. The cloud security system evaluates misconfigurations on top the ingestion of other risk scoring. The cyber security appliance already provides factors for risk scoring from the organization's known system. Again, the cloud security system computes and generates that infrastructure in the discrete cloud network from just a basic list of resources. This cloud security system enumerates and maps out what components are in this particular cloud architecture and determines scores for this particular cloud architecture, which can ingest any other existing risk scoring for these resources put into this discrete cloud network when generated by the cloud security system. Thus, the cloud security system is configured to generate a risk value (score) associated with the discreet cloud architecture in addition to cloud resources within that discreet cloud architecture.

Finally, future developments will map serverless resources into the same architecture or create architectures to represent permissions hierarchies.

C. Architecture Reduction Phase

After creation of the cloud architectures, a reduction phase is conducted where the cloud security system is configured to determine whether any of the cloud architectures can be merged together to avoid duplication and overlap. This may involve a determination as to whether a prescribed percentage of core, node types (e.g., compute engines, logical data stores, compute services, etc.) associated with one cloud architecture overlaps another cloud architecture, followed by a determination as to whether policies and access control metrics (e.g., permissions, privileges, etc.) warrant merging the cloud architectures. The reduction phase operations are to determine whether there is a significant disparity between the cloud architectures for them to remain separate.

Additionally, the cyber security appliance may be configured to use a snapshot analysis with a specific type of predictive machine learning such as an AI transformers to predict software being run. The suggested method would use a specific type of machine learning such as an AI transformer, LSTM, AI classifier, to identify what a system is (CPE-Common Platform Enumeration) based upon a, e.g., transformer analysis of the bytes. The snapshot analysis with, for example, an AI transformer determines processes that are running and try to establish software running on an EC2 instance or running in a Kubernetes cluster. Snapshots of the processes can be usually taken for backup storage purposes in cloud environments.

In accordance with snapshot analytics, the cyber security system would first boot up a series of example platforms and systems. A snapshot of these systems would be taken by a component within the cyber security system, and the snapshot file bytes would be read by an AI transformer. This would be performed on known systems, and then trained to produce a prediction on a snapshot of an unknown system. Thus, a prediction is conducted as to what the cyber security system thinks is running on a certain compute engine (e.g., EC2) or a certain in a Kubernetes cluster based on the snapshots. The cyber security system can analyze sequences and/or strings of a snapshot, so the cyber security does not have to analyze only the actual running piece of infrastructure or the running resource. The AI transformer makes a comparison to snapshots of known processes running on the compute engine and/or Kubernetes clusters compared to snapshot of an unknown system can be made to predict what the system thinks is running on a certain compute engine or a certain in a Kubernetes cluster.

In summary, the deployment and operability of the cyber security system within an AI-based enterprise security system offers a number of competitive advantages. First, the cyber security system provides comprehensive visibility, response, proactive and reactive assessment as analytics are being conducted from multiple. Secondly, the visualization of the cloud architectures and their cloud resources assists in investigate of cloud operability and cloud-based cyber threats from a non-cloud-expert perspective. Lastly, risk assessment is not being conducted on an individual asset or resource basis in isolation, Rather, the risk assessment contextualized against all their linked resources, and how they work in combination with other cloud resources, inclusive of virtual devices as well as roles, behaviors, and the like.

As a result, the deployment of the cloud security system within the enterprise security system supports an organization's security team by providing comprehensive visibility and an in-depth understanding of their cloud environment. With a unique approach that combines cloud asset enumeration, architecture modelling, flow log analysis, CSPM, entitlement management, cloud autonomous response, identity activity monitoring, deep cloud network behavioral monitoring, cost analysis and more; to build a holistic understanding of an organisations cloud.

The cyber security system is designed to extend all the enterprise's capabilities to the cloud-both from ability to learn what is normal operations and/or behaviours of the enterprise, but also to focus down and centralize significant volumes of complex data into actionable insights for one or more network administrators (security teams). Also, this enables security teams to operate on the level of (and speak the same language) as development (devops) teams.

The cyber security system operates independently and can draw upon capabilities and insights from across different security platforms (e.g., cloud platforms for cloud data, network platforms for network data, etc.). Stated differently, the cyber security system allows for cyber threat visualization through a graphical user interface to allow for cyber threat analytics based on cloud architectures separately or concurrently with other analytics directed to network data, logs, user behaviours, or the like.

Also, the deployment of the cloud security system within the enterprise security system translates cloud infrastructure management down to a human understandable level. Here, security and devops perspectives are combined into a unified visualization that allows for easier understanding and monitoring of the entire security landscape, inclusive of cloud architectures.

The security schema provided, at least in part, by the cloud security system is adapted to offer a static view of what the devops team intended for the consumer cloud environment infrastructure and identifies security issues that might not have been anticipated or appreciated when the infrastructure was built. Additionally, the security schema offers a dynamic view to account for user-initiated or other system changes that may be potentially malicious and provide a visualization so that the security team can assess as to whether any changes are needed, or any additional security implementations (or setting changes) is warranted.

Furthermore, the cyber security system is configured to gather and maintain all the cloud resources and attempt to uncover connections or links between the resources to group them together into a set of resources that may be represented as a cloud architecture. Thereafter, this allows grouping and/or prioritization of cloud architecture misconfigurations, including misconfigurations tied to network traffic data flow occurring in real time. Stated differently, the cyber security system identifies the cloud resources, categorizes them, groups them into separate, human-readable groups where context is provided to allow for network administrators (security team) to detect misconfigurations within the cloud architecture and anomalous events occurring in real-time due to breaches for example. This provides better visibility to security and devops teams as to what is actually going on in the customer cloud environment.

These and other features of the design provided herein can be better understood with reference to the drawings, description, and claims, all of which form the disclosure of this patent application.

BRIEF DESCRIPTION OF THE DRAWINGS

Embodiments of the invention are illustrated by way of example and not by way of limitation in the figures of the accompanying drawings, in which like references indicate similar elements and in which.

Figure 1A:
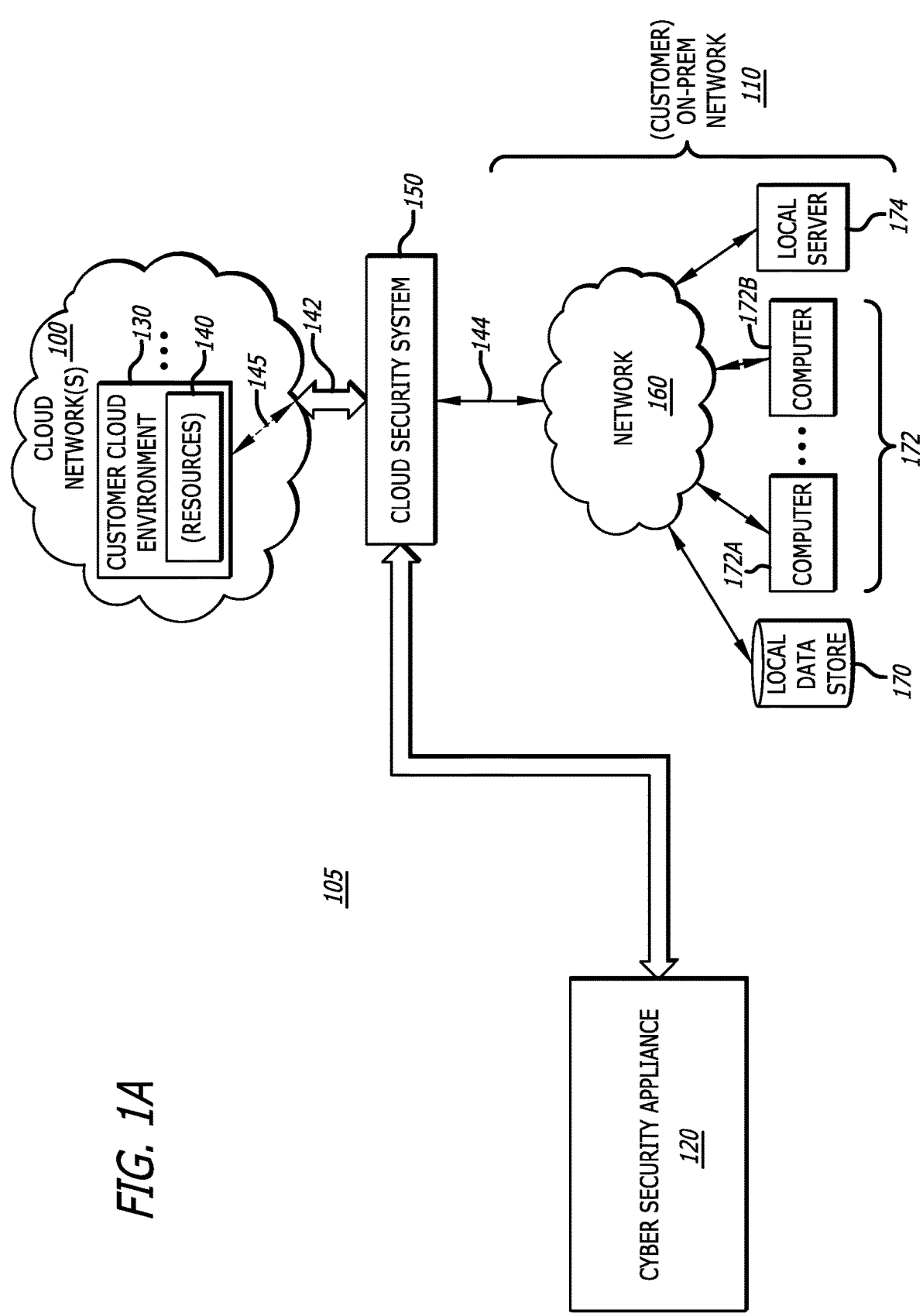
FIG. 1A illustrates a block diagram of a first embodiment of a cloud security system deployed within a cloud environment managed by a cybersecurity provider to (a) autonomously interact with cloud network(s) to identify cloud resources and cloud architectures associated with a customer cloud environment and (b) interact with a cyber security appliance deployed within a customer on-premises ("on-prem") network to perform analytics on the cloud resources and/or cloud architectures to identify potential cyber threats.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that one or more embodiments of the disclosure can be practiced without these specific details. In other instances, well-known components or methods have not been described in detail but rather in a block diagram in order to avoid unnecessarily obscuring the present design. Further, specific numeric references, such as a first computing device for example, have been made. However, the specific numeric reference should not be interpreted as a literal sequential order but rather interpreted that the first computing device may be different from a second computing device.

As set forth herein, the specific details are merely exemplary and for illustrative purposes. Hence, the features implemented in one embodiment may be implemented in another embodiment where logically possible. The specific details can be varied from and still be contemplated to be within the spirit and scope of the present system or component configuration.

I. Terminology

In the following description, certain terminology is used to describe various features of the invention. For example, the terms "component," "module" and "logic" are structures that can be implemented with electronic circuits, software stored in a memory executed by one or more processors, and/or a combination of both. For instance, the component (or module or logic) may be representative of hardware, firmware or software that is configured to perform one or more functions. As hardware, a component (or module or logic) may include physical circuitry having data processing or storage functionality. Examples of such circuitry may include, but are not limited or restricted to a hardware processor (e.g., microprocessor with one or more processor cores, a digital signal processor, a graphics processing unit (GPU), a programmable gate array, a microcontroller, an application specific integrated circuit "ASIC," etc.), a semiconductor memory, or combinatorial elements.

Alternatively, the component (or module or logic) may be software that includes code being one or more instructions, commands, or another data structure that, when compiled and/or processed (e.g., executed), perform a particular operation or a series of operations. Examples of software may include an application, a process, an instance, an Application Programming Interface (API), a routine, a sub-routine, a plug-in, a function, an applet, a servlet, code, a script, a shared library/dynamic link library (dl), logical circuitry (e.g., logical functionality of the physical circuitry descried above), or one or more instructions. This software may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; non-persistent storage such as volatile memory (e.g., any type of random-access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the component (or module or logic) may be stored in persistent storage.

In general, the term "resource" generally relates to any logical or physical element that performs a specific task or function directed to managing security of a logical or physical network. Hence, a "cloud resource" relates to a logical element that performs a specific task or function within a cloud network. Examples of cloud resources may include, but are not limited or restricted to cloud-based components or services such as compute engines (e.g., AWS™ EC2, Azure® Azure® virtual machines, Google® compute engine, etc.), logical data stores (e.g., AWS™ S3, Azure® blob storage, etc.), policies, roles, users, certificates, virtual machines, network-based resources such as virtual private clouds (VPCs) or subnets, or the like.

The term "content" generally relates to a collection of information, whether in transit (e.g., over a network) or at rest (e.g., stored), often having a logical structure or organization that enables it to be classified for cloud architecture formation and cyber-threat detection and prevention.

The term "computing device" should be generally construed as electronics with data processing capability and/or a capability of connecting to any type of network, such as a public network (e.g., Internet), a private network (e.g., a wireless data telecommunication network, a local area network "LAN," etc.), or a combination of networks. Examples of a computing may include, but are not limited or restricted to, the following: a server, a mainframe, a firewall, a router; or an endpoint device (e.g., a laptop, a smartphone, a tablet, a desktop computer, a netbook, gaming console, a wearable, etc.), or the like. The term "computing device(s)" denotes one or more computing devices.

The term "interconnect" may be construed as a physical or logical communication path between two or more electronic devices or between different logic (engine or components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include any mechanism that allows for the exchange of content between different logic.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frame, or any other series of bits having the prescribed, structured format. The term "computerized" generally represents that any corresponding operations are conducted by hardware in combination with software or firmware.

The character set "(s)" denotes one or more elements. For example, the term "network(s)" denotes one or more networks. The term "component(s)" denotes one or more components. The term "cloud architecture(s)" denotes one or more cloud architectures, and the like.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

II. General Architecture

Referring to FIG. 1A, a block diagram of a first embodiment of a cloud security system 150 deployed in a cyber-security provider managed (CP-managed) cloud environment is shown. Herein, a cyber security appliance 120 may be hosted in a customer on-premises ("on-prem") network 110 and the cloud security system 150 may be hosted separately in the CP-managed cloud environment (e.g., AWS, Azure, etc.). The cloud security system 150 may be configured to (a) autonomously interact with one or more cloud networks 100 (hereinafter, "cloud network(s)" 100) to identify cloud resources 140 (and cloud architectures) associated with a customer cloud environment 130 and (b) interact with the cyber security appliance 120 to perform analytics on the cloud resources and/or cloud architectures to identify potential cyber threats.

In particular, according to one embodiment of the disclosure, the cloud security system 150 may be pre-configured to communicate with the cloud network(s) 100 and the cyber security appliance 120. The cyber security appliance 120 and the cloud security system 150 collectively operate as a security system 105 for an enterprise (hereinafter, "enterprise security system").

Figure 1B:
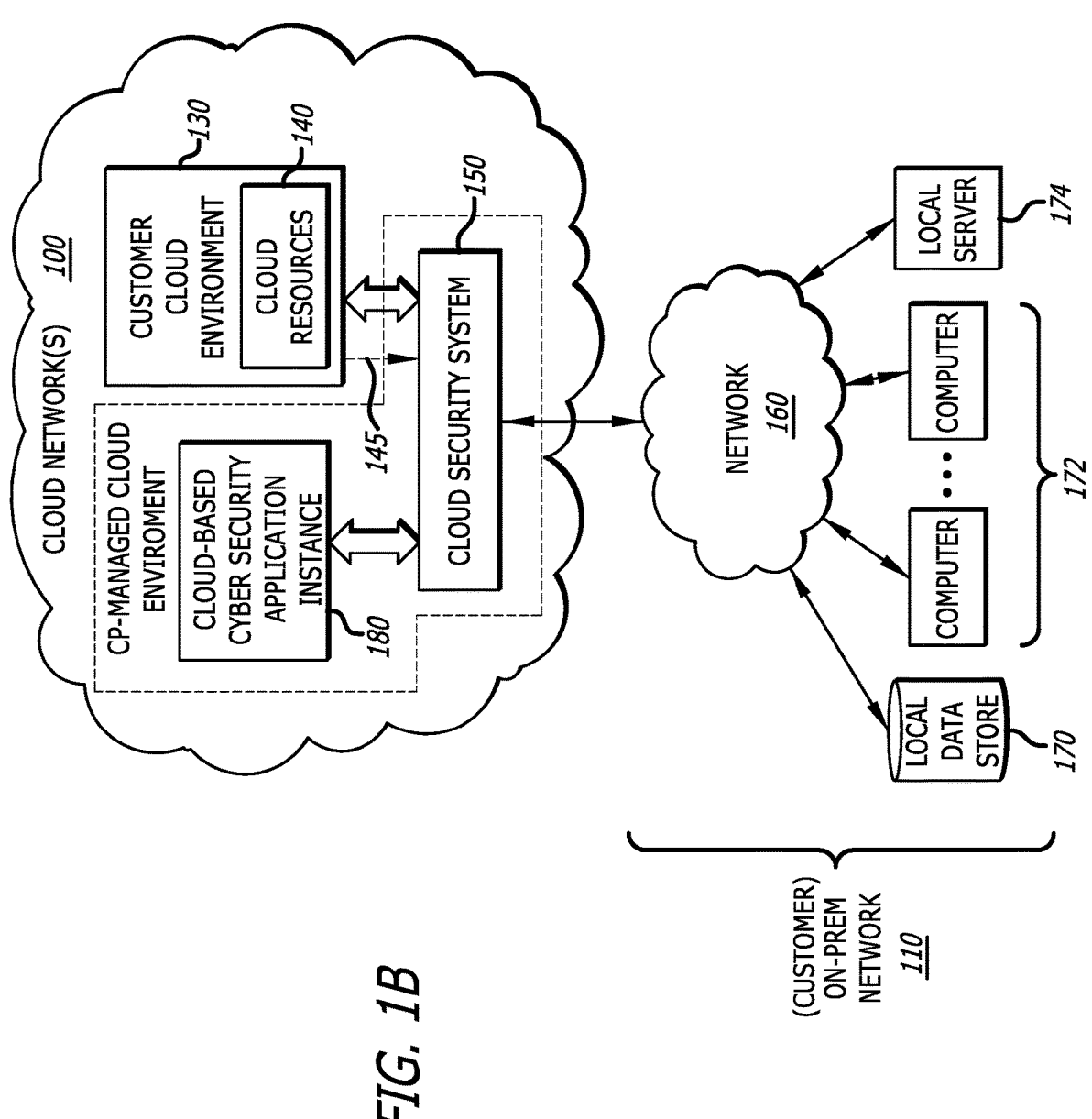
FIG. 1B illustrates a block diagram of a second embodiment of the cloud security system deployed within a cloud environment managed by a cybersecurity provider to (a) autonomously interact with cloud network(s) to identify cloud resources and cloud architectures associated with a customer cloud environment and (b) interact with a cloud-based cyber security appliance to perform analytics on the cloud resources and/or cloud architectures to identify potential cyber threats.

As another embodiment, as shown in FIG. 1B, both the cyber security system 150 and the cloud security appliance 120 may be hosted in the CP-managed cloud environment in communication with the customer cloud environment 130. Herein, the cloud security system 150 is configured to (a) autonomously interact with cloud network(s) 100 to identify cloud resources and/or cloud architectures 140 associated with the customer cloud environment 130 and (b) interact with the cyber security appliance 120 to perform analytics on the cloud resources and/or cloud architectures 140 to identify potential cyber threats.

As yet other embodiments, the cloud security system 150 may be deployed as part of the customer on-prem network 110 interacting with cloud network(s) 100 to identify cloud resources and/or cloud architectures 140 associated with the customer cloud environment 130 and interacting with the cyber security appliance 120 deployed with the on-prem network 110 or a CP-managed cloud environment. More specifically, as shown in FIG. 1A, the cloud security system 150 is configured to autonomously interact with the customer cloud environment 130 maintained with the cloud network(s) 100 via interconnect 142. Herein, the cloud security system 150 is configured to identify cloud resources 140 within the customer cloud environment 130 and access metadata 145 associated with the cloud resources 140. The cloud resources 140 may include cloud-based components, services, and/or access controls (e.g., roles, policies including permissions, profiles, etc.) associated with the customer cloud environment 130, which are maintained within the cloud network(s) 100 operating as a part of a public cloud network. Alternatively, the cloud network(s) 100 may operate as one or more private cloud networks accessible to the customer.

Additionally, the cloud security system 150 is configured to identify the cloud resources 140 and cloud architectures assembled with a subset of the cloud resources 140 to provide a visualization of the customer cloud environment 130. Furthermore, the cloud security system 150 is configured to perform analytics on both the cloud resources 140 and the cloud architectures to identify misconfigurations and cyber threat risks thereof. The metadata 145 associated with the cloud resources 140 and/or cloud architecture(s) along with the misconfiguration and risk findings may be used by the cyber security appliance 120 to identify potential cyber threats for the cloud architecture(s) and/or the individual cloud resources 140.

As further shown in FIG. 1A, the on-prem network 110 features a local network 160 that enables communications between a number of computing devices such as a local data store 170, one or more computers 172, and/or a local server 174. Consequently, all of the computers 172 are able to access the local server 174 and content within the local data store 170. According to this embodiment of the disclosure, the cloud security system 150 is coupled to both the local network 160 and to the cloud network(s) 100 via interconnects 142 and 144.

The cyber security appliance 120 may be a component residing outside or even inside the on-prem network 110 as shown or may be implemented as part of any or all of the computers 172. For this illustrative example, where functionality of the cyber security appliance 120 is deployed within a first computer 172a, including electronic hardware, modules, models, and various software processes of the cyber security appliance 120, the first computer 172a runs threat detection for detecting cyber threats pertaining to the customer cloud environment 130. As such, the first computer 172a includes one or more processors arranged to run the steps of the process described herein, memory storage components required to store information related to the running of the process, as well as network interfaces for collecting and acquiring information from the cloud security system 150 and/or any probes or other sensors collecting data from the network under analysis.

Referring still to FIG. 1A, the cyber security appliance 120 is configured to build and maintain dynamic, ever-changing models of the "normal behavior" of each user and computer within the enterprise security system 105 as well as the cloud resources and/or architectures utilized by a customer deploying the enterprise security system 105. This approach may be based on Bayesian mathematics, and monitors all interactions, events, and communications within both the system (e.g., which computer is talking to which, files are being created, networks are being accessed or the like) and the customer cloud environment 130 (e.g., customer cloud resources and/or cloud architecture(s) identified, metadata associated with the cloud resources and/or cloud architecture(s) collected, resource intercommunications determined, cost metrics for cloud resources and/or cloud architecture(s) collected and determined, cyberthreat risk for cloud resources, cloud architecture(s) and/or resource misconfigurations is determined, etc.).

For example, computer 172b or one of the cloud resource 140 may be based in the West Coast and is operated by a marketing employee who regularly accesses the marketing network, usually communicates with physical (computer 172a) or logical (cloud resource 140) devices between 9:30 a.m. and midday, and is active from around 8:30 a.m. until 6 p.m. The same employee virtually never accesses the employee timesheets, rarely connects to the company's VLAN network as represented by local server 174, and has no dealings with Southeast Asia. The cyber security appliance 120 takes all the information that is available relating to the employee and establishes a "pattern of life" (AI model) for that person and for the physical and/or logical devices used by that person in that system which is dynamically updated as more information is gathered.

The AI modeling of the normal pattern of life for an entity (e.g., person, resource, etc.) in a network under analysis is used as a moving benchmark, allowing the cyber security appliance 120 to spot behavior on with the enterprise security system 105, including the customer cloud environment 130 monitored by the cyber security system 150, that seems to fall outside of the normal pattern of life and flags this behavior as anomalous, requiring further investigation and/or autonomous action. These operations are based on activity by the user as the cyber security appliance 120 takes into account the activities as described above as well as the risks associated with the customer cloud environment 130, which are provided by the cloud security system 150 and based, at least in part, on misconfigurations, vulnerabilities, the presence of sensitive data within publicly accessible cloud resources, or the like.

Referring now to FIG. 1B, a block diagram of a second embodiment of the cloud security system 150 deployed as part of the customer's on-prem network 110 is shown. Herein, the cloud security system 150 is configured to autonomously identify cloud resources 140 within the cloud environment 130 and access metadata associated with the cloud resources 140. Differing from FIG. 1A, as shown in FIG. 1B, the cyber security appliance may be deployed as an instance 180 within the cloud network(s) 100 accessible by the customer. Herein, the cloud security system 150 is adapted to interact with the customer cloud environment 130 in order to enumerate the cloud resources 140, conduct resource property discovery in order to assess threats, vulnerabilities, and sensitive stored information, determine enriched metrics and activity metrics to populate a data store including the metadata 145 associated with the cloud resources 140.

From these cloud resources 140, the cloud security system 150 may be able to generate cloud architectures and render these cloud architectures for visual display by the administrator. The cloud security system 150 is further configured to conduct risk assessments as to the threat levels associated with particular cloud resources as well as the cloud architecture(s) formed by some or all of these cloud resources 140. Herein, the cloud security system 150 is further configured to interact with the cloud-based cyber security appliance instance 180 in order to assess risks based on modeling conducted to determine patterns of life associated with the user or resource or cloud architecture, which are generated from the metadata 145 and based on AI models maintained as part of the cyber security appliance instance 180.

Figure 1C:
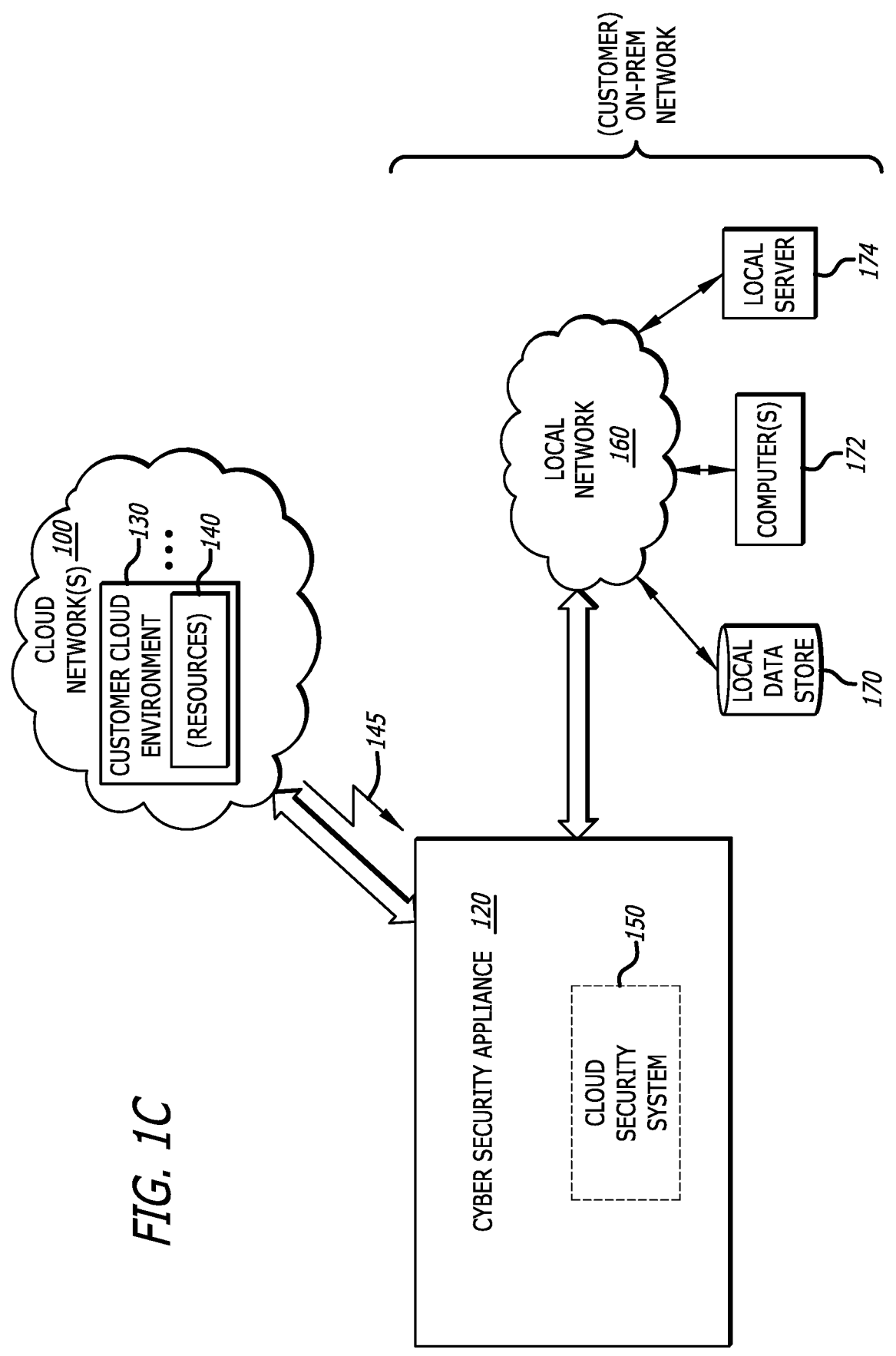
FIG. 1C illustrates a block diagram of a third embodiment of a cloud security system hosted as part of the cyber security appliance to (a) identify cloud resources and cloud architectures associated with a customer cloud environment and (b) perform analytics on the cloud resources and/or cloud architectures to identify potential cyber threats.

Referring to FIG. 1C, a block diagram of a third embodiment of the cloud security system 150 is shown. Herein, the cloud security system 150 is hosted by the cyber security appliance 120 to assess information associated with cloud resources 140 for the customer cloud environment 130 and to perform analytics on the information to determine whether any cloud architectures pertaining to the customer cloud environment 130 feature cyber threats. This may be accomplished by the cloud security system 150 having access to the customer cloud environment 130 enumerating the cloud resources 140, gather metadata 145 associated with the cloud resources 140 (including metadata about the resources and/or the relationships these resources have with each other) in order to generate the cloud architecture(s) pertaining to these cloud resources 140. Thereafter, the cloud architecture(s) can be visibly displayed along with risk levels identifying the potential threat of a cyberattack in connection with a particular cloud resource and/or the entire cloud architecture.

Figure 2:
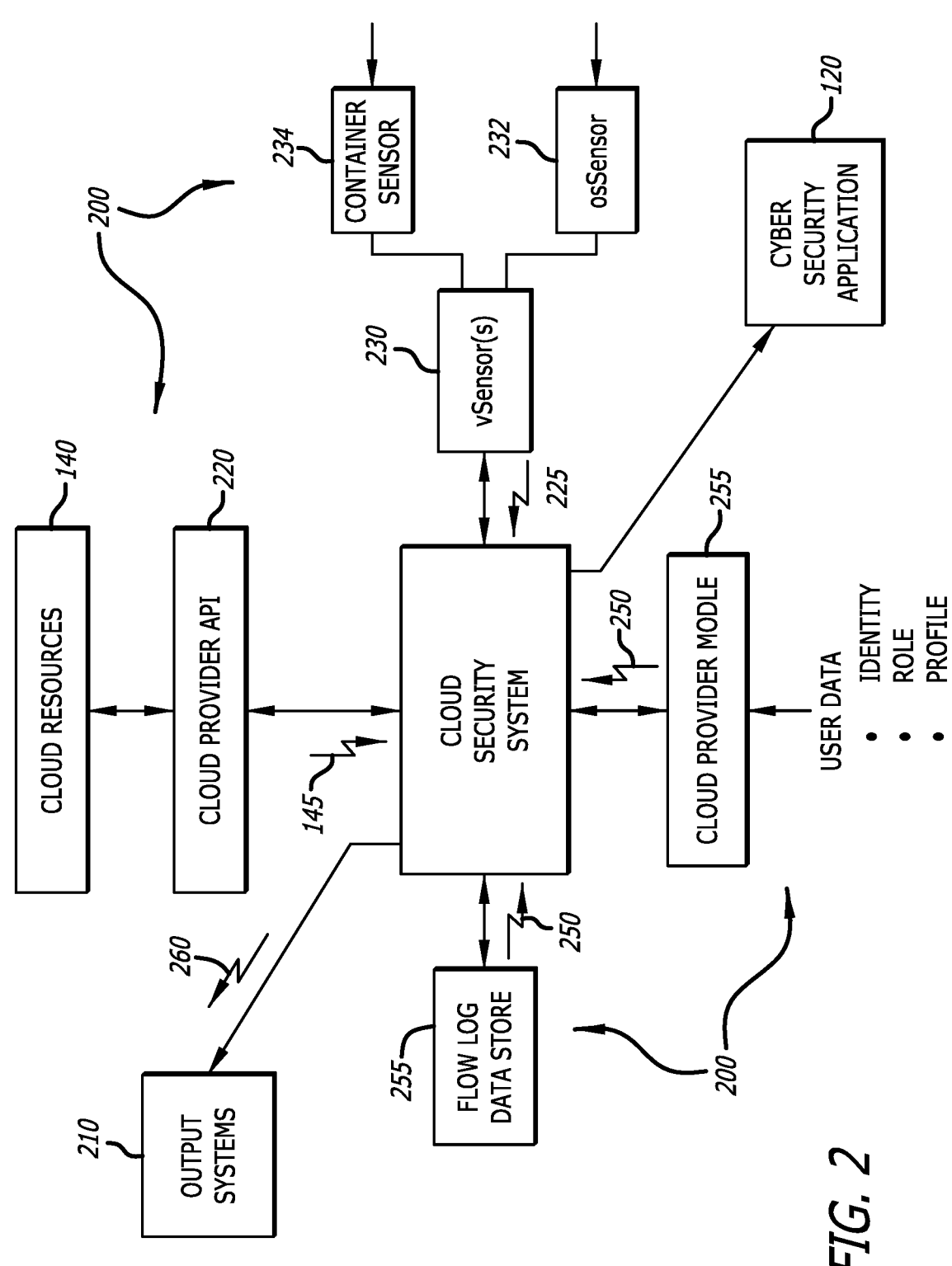
FIG. 2 illustrates a block diagram of the general interactions between the cloud security system of FIGS. 1A-1B and both source content providers and output systems.

Referring to FIG. 2, a block diagram of the general interactions between the cloud security system 150 of FIG. 1A or FIG. 1B as well as a plurality of content providers 200 and output systems 210 is shown. Herein, as described above and illustrated in FIG. 1A and/or FIG. 1B, the cloud security system 150 is configured for ingest data from different sources, including the metadata 145 associated with the cloud resources 140 of the customer cloud network(s) 100 as obtained via a cloud provider API 220, network traffic data 225 from vSensors 230 as provided by hosted agents (osSensors 232, container (Kubernetes) sensors 234, etc.), user data 240 (e.g., user profiles, user role information, user profiles, etc.) via a cloud provider module 245 (e.g., AWS module), and/or log data 250 (e.g., flow logs and/or audit logs to track identity-based behaviors maintained in a flow log data store 255).

In particular, the cloud security system 150 is configured with components to perform a number of operations on the ingested data. Some of these operations may include, but are not limited or restricted to the following: cloud resource enumeration, access mapping for access/network path determination, cloud security posture management (CSPM) directed to compliance and misconfiguration detection, Kubernetes Security Posture Management (KSPM) directed to compliance with Kubernetes environments, cost analytics, risk modeling, and/or cloud architecture generation and rendering.

As shown in FIG. 2, the cloud security system 150 is communicatively coupled to the output systems 210. More specifically, after conducting operations on the ingested data, the cloud security system 150 may be configured to provide one or more messages 260 to the output systems 210, where the messages 260 may constitute notifications, display message signaling (e.g., Slack® messages, chat messages over a video-conferencing platform, graphical signaling for rendering cloud architecture representations, etc.), or even a "support" or "help" message (e.g., GitLab or ServiceNow ticket). Additionally, or in the alternative, the cloud security system 150 may further be coupled to the cyber security appliance 120 to leverage the AI modeling, autonomous response, and other modules in order to identify and tackle potential cyber threats.

Figure 3:
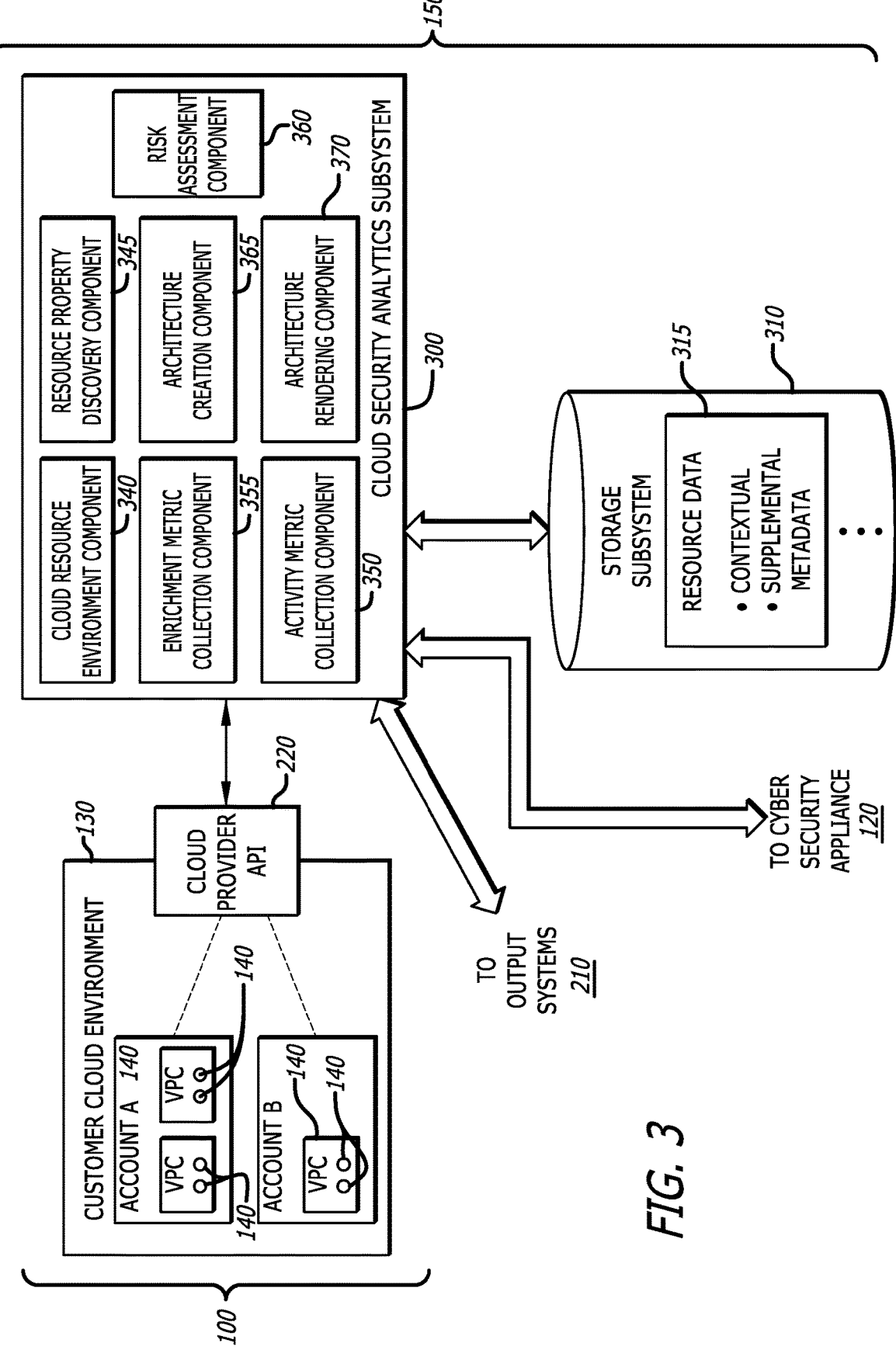
FIG. 3 illustrates a block diagram of the cloud security system, operating as part of the on-prem network of FIGS. 1A-1B, to collect information from different sources to formulate a holistic understanding of enterprise security inclusive of security of the customer cloud environment.

Referring now to FIG. 3, a block diagram of an exemplary embodiment of the cloud security system 150 is shown, where the cloud security system 150 is configured to, among other things, identify cloud resources, populate local storage subsystem with information associated with the cloud resources 140, generate cloud architectures upon which pattern of life analytics may be conducted to determine potential cyber threats. Herein, the cloud security system 150 features a cloud security analytics subsystem 300 and a storage subsystem 310. The storage subsystem 310 may be configured as one or more local data stores to maintain information associated with the cloud resources 140 detected by the cloud security analytics subsystem 300.

As an illustrative example, the storage subsystem 310 may include a first data store to maintain contextual information (e.g., resource name, identifier within the cloud service (customer cloud environment), cloud account identifier, resource type, location, service type (e.g., EC2, Lambda, etc.) along with supplemental metadata such as with resource properties (e.g., threat intelligence, presence of sensitive information such as financials or private personal information of employees, and known vulnerabilities pertaining to that cloud resource) and enriched metadata (e.g., activity metrics, cost metrics, misconfiguration metrics, etc.). Collectively, the contextual information and supplemental metadata associated with the cloud resources 140 provide a holistic view of the totality of the cloud resources as well as their context.

According to one embodiment of the disclosure, the cloud security analytics subsystem 300 is communicatively coupled to the customer cloud environment 130 accessible via a cloud provider API 220 to access and identify the cloud resources 140 as well as to collect the supplemental metadata associated with the cloud resources 140. The cloud security analytics subsystem 300 is further coupled to output systems 210 to provide messages as notifications, chat messages, or tickets to request activity by a particular service provider. The cloud security analytics subsystem 300 may further be coupled to the cyber security appliance 120 to leverage the AI modeling, autonomous response, and other modules in order to identify and tackle potential cybersecurity threats.

According to this embodiment of the disclosure, the cloud security analytics subsystem 300 features a cloud resource enumeration component 340, a resource property discovery component 345, an activity metric collection component 350, an enrichment metric collection component 355, a risk assessment component 360, an architecture creation component 365 and/or an architecture rendering component 370.

These components 340-370 may be configured to operate concurrently in which cloud architectures are generated based on information associated with the cloud resources uncovered by the cloud resource enumeration component 340.

As shown in FIG. 3, according to one embodiment of the disclosure, the cloud resource enumeration component 340 is configured to identify cloud resources, namely locate the cloud resources 140 that exist within the customer cloud environment 130. These cloud resources 140 may include any logical element that performs a specific task or function within a cloud network such as a compute engine (e.g., AWS™ EC2, Azure® Azure® virtual machines, Google® compute engine, etc.), a logical data store (e.g., AWS™ S3, Azure® blob storage, etc.), policy, user role (e.g., for permission/privilege insight for resource accessibility), virtual private cloud (VPC), user profile (for identity monitoring), certificate (for user authentication and access controls), or the like. Metadata associated with each of the identified cloud resources is collected, categorized, and provided to the storage subsystem 310.

According to this embodiment, the cloud resource enumeration component 340 may be further configured to conduct access mapping operations by determining what cloud resources have access to other resources. This analysis may involve an evaluation of the cloud resource metadata, where the evaluation may be conducted by search logic to identify communications paths between cloud resources (hereinafter, "access paths"). Additionally, the cloud resource enumeration component 340 may be configured to conduct network mapping operations by performing analytics of the network-based cloud resources (e.g., VPCs, subnets, etc.) as well as the network policies to determine communication paths for these network-based cloud resources (hereinafter, "network paths").

According to one embodiment of the disclosure, as further shown in FIG. 3, the resource property discovery component 345 is configured to identify and collect resource property information from one or more queries to the cloud provider API 220. The resource property information may be directed toward threat intelligence, vulnerabilities, and sensitive information maintained within the cloud resources 140. This resource property information may be used by the risk assessment component 360 to determine risk levels associated with each cloud resource as well as cloud architectures-namely a set of connected cloud resources that are interconnected within the customer cloud environment 130 representing a discrete infrastructure or project.

The activity metric collection component 350 is configured to determine how cloud resources behave within the customer cloud environment 130. In particular, the activity metric collection component 350 may be configured to conduct analyses of log data and network traffic data in light of access controls (e.g., user privileges, user permissions, and/or policies). For example, the activity metric collection component 350 may perform identity monitoring by conducting analytics on audit logs to learn who or what is accessing the cloud resources 140. The activity metric collection component 350 may further perform enhanced identity monitoring by analyzing user roles to better understand privileges and insights into resource accessibility. Also, the activity metric collection component 350 may evaluate cloud resource behavior based on network traffic data received from vSensor(s), osSensor(s), and/or container (Kubernetes) sensors in a cloud network. The metrics gathered from operations performed by the activity metric collection component 350 are added to metadata associated with pertinent cloud resources maintained within the storage subsystem 310.

The enrichment metrics collection component 355 is configured to perform cloud security posture management (CSPM) by at least conducting analytics on information associated with the cloud resources 140 in order to detect compliance and/or misconfiguration of these cloud resources within the customer cloud environment 130. The enrichment metrics collection component 355 is further configured to perform Kubernetes security posture management (KSPM) to determine compliance and/or misconfiguration within the Kubernetes environment. Additionally, the enrichment metrics collection component 355 may be configured to perform cost analytics as to costs associated with a particular cloud resource and/or a particular cloud architecture after generation by the architecture creation component 365.

Figure 8:
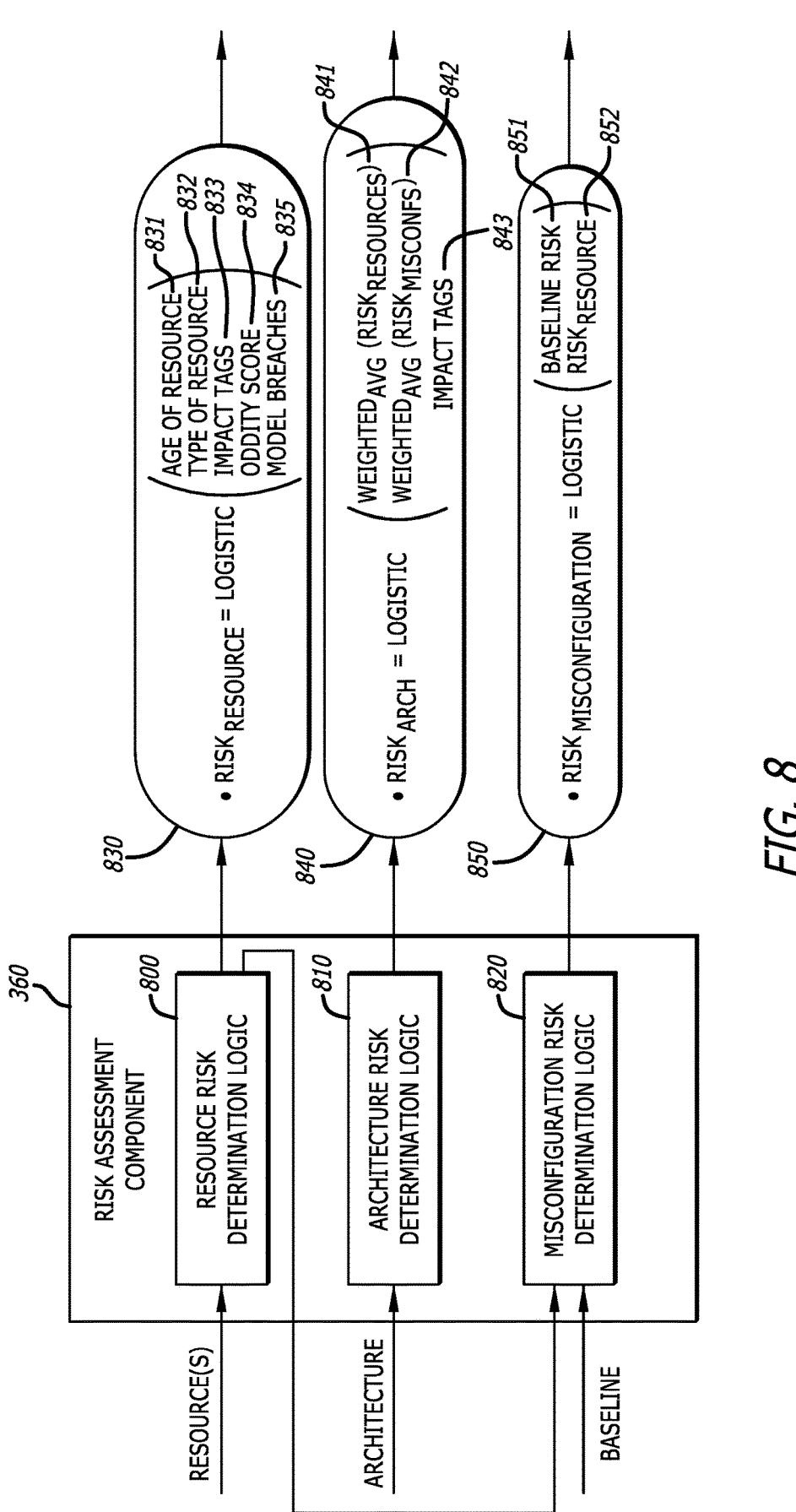
FIG. 8 illustrates a block diagram of a risk assessment component of the cloud security system of FIG. 3 to determine risk levels associated with a cloud resource and/or cloud architectures.

The risk assessment component 360 is configured to determine an estimated risk level associated with each cloud resource and/or determined cloud architectures, where the cloud architecture risks may be based on weighted risk computations along with "impact tags," namely heightened risk values assigned by the customer based on believed importance of certain cloud resources to the customer. The risk assessment component 360 is able to compute a resource risk determination, an architecture risk determination, and a misconfiguration risk determination as illustrated in FIG. 8.

Lastly, the activity metric collection component 355 may be configured to conduct a third analysis (attack path mapping) to prioritize critical routes across the customer cloud environment 130. These paths are provided into a graphical data store within the storage subsystem 310 of FIG. 4.

Referring still to FIG. 3, the architecture creation component 365 is configured to determine cloud architecture (constructs) that represent a set (two or more) of the enumerated cloud resources in communication and associated with a unified purpose. The formation of the cloud architectures may be based on inter-resource relationships between the cloud resources 140 determined through access and network mappings as well as access controls. The architecture rendering component 370 is configured to generate graphical representations of the created cloud architectures as determined by the architecture creation component 365 where edge lines are used to represent relationship and communications between cloud resources represented as graphical nodes.

Figure 4:
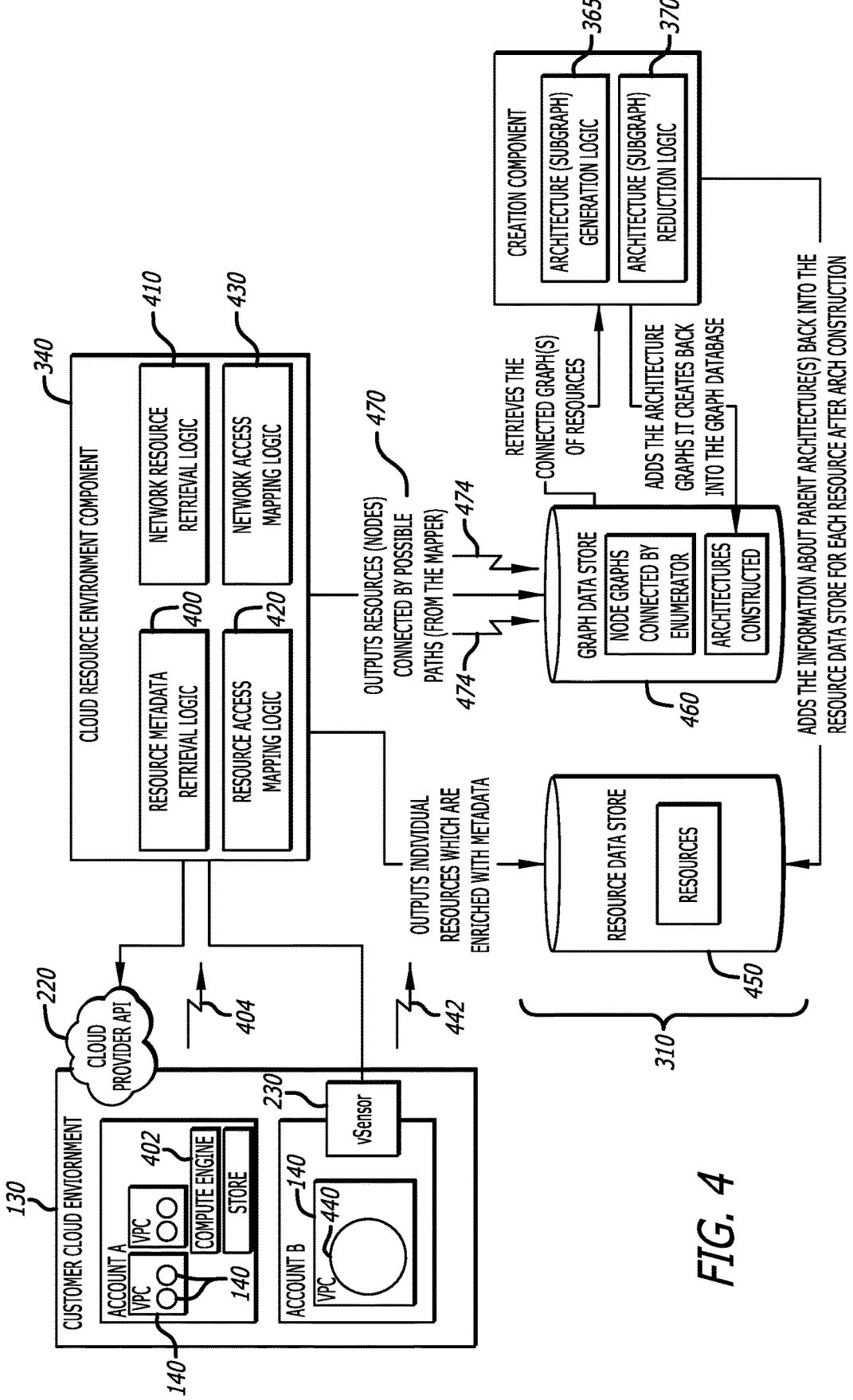
FIG. 4 illustrates a block diagram of a cloud resource enumeration component of the cloud security system of FIG. 3 to identify cloud resources notably cloud components, enumerate metadata associated with the cloud components, identify cloud resource notably network cloud components, enumerate metadata associated with cloud components, and conducting mapping of the cloud resources.

Referring to FIG. 4, a block diagram of a cloud resource enumeration component 340 of the cloud security system 150 of FIG. 3 to identify cloud resources, enumerate metadata associated with these resources, identify network resources, enumerate metadata associated with these network resources, and conduct mapping of these resources. This may be accomplished through resource metadata retrieval logic 400, network resource retrieval logic 410, resource access mapping logic 420, and network access mapping logic 430.

As shown, the resource metadata retrieval logic 400 may be configured to access the customer cloud environment 130 via the cloud provider API 220 in order to identify the cloud resources 140 associated with the customer cloud environment 130 and collect information (e.g., metadata) associated with each of the cloud resources 140. The cloud resources 140 may include any or all of the following: compute engines, logical data stores, policies, user roles, user profiles, digital certificates, or the like.

As an illustrative example, upon identifying a compute engine 402 as one of the cloud resources 140 utilized by the customer cloud environment 130, the resource metadata retrieval logic 400 collects information 404 associated with the compute engine 402. For a AWS™ cloud environment, the metadata associated with the compute engine 402 (e.g., EC2) may include, but is not limited to various contextual information such as the EC2 name (e.g., payment-controller), AWS identifier (ID) for the EC2, AWS account ID, resource type (e.g., instance), region (e.g., US East (N. Virginia), service type (e.g., EC2), running status (e.g., running), OS (e.g., Linux/Unix), and the like.

The network resource retrieval logic 410 is configured to access the customer cloud environment 130 via the vSensor 230 in order to identify network-based cloud resources 440, being part of the cloud resource 140. The network-based cloud resource 440 may include VPCs and/or subnets for example. The network resource retrieval logic 410 is further configured to collect information 442 (e.g., metadata) associated with each of the network-based cloud resources 140. Some of the metadata 442 associated with the network-based cloud resources 440 may differ based on their resource type.

The information collected for each of the cloud resources identified by the resource metadata retrieval logic 400 and the network resource retrieval logic 410 is provided to a resource data store 450, which is part of the storage subsystem 310 of FIG. 3. This information is further enhanced with metadata collected from the resource access mapping logic 420 and network access mapping logic 430 as described below.

The resource access mapping logic 420 is configured to conduct analytics on the metadata associate with the cloud resources 140 to determine what cloud resources have access to other resources. The analytics may involve operations by search logic within the cyber security system 150 of FIGS. 1A-1C, starting at a selected cloud resource within the customer cloud architecture (e.g., compute engine, logical data store, etc.) and identifying other cloud resources that are communicatively coupled to the selected cloud resource. These operations may involve analytics on policies associated with the cloud resources to determine communicative relationships between them. These iterative operations are repeated for each of the other cloud resources to establish access paths between the cloud resources 140.

Similarly, for certain cloud resources, namely the network-based cloud resources 440, the network access mapping logic 430 may be configured to conduct network mapping operations by performing analytics of the network-based cloud resources (e.g., VPCs, subnets, etc.) to determine the network paths for these network-based cloud resources.

Metadata associated with the access paths and network paths is provided to supplement/augment content within the resource data store 450 as well as provided to the graphical data store 460. The graphical data store 460 is part of the storage subsystem 310 of FIG. 3 and receives content 470 associated with resources to generate a nodal graph, namely the content associated with the cloud resources to be represented as nodes (hereinafter, "node content" 472) and content associated with the access paths and/or network paths to be represented as edges interconnecting the nodes (hereinafter, "path content" 474). More specifically, the graphical data store 460 is communicatively coupled to the architecture creation component 365, and thus, is configured to provide the node content 470 and the path content 475 in response to a retrieval message from the architecture creation component 365.

Referring back to FIG. 3, the architecture creation component 365 is configured to determine cloud architectures (constructs) that represent a set (two or more) of the enumerated cloud resources in communication. The formation of the cloud architectures may be based on inter-resource relationships between the cloud resources determined through the access and network mappings, taking into account access controls (e.g., policies, permissions, privileges, etc.).

As these cloud architectures may overlap, the architecture rendering component 370 may be configured to perform architecture reduction by identifying overlapping cloud architectures and understanding the relationship between these overlapping cloud architectures. More specifically, the architecture reduction operations identify salient cloud resources that are shared by different cloud architectures. Thereafter, the similarity (compatibility) between these cloud architectures is determined based on relationships (e.g., policies, privileges and/or permissions) pertaining to the cloud architectures and/or cloud resources associated with these cloud architectures. If there is sufficient overlap (e.g., for AWS cloud environment-a first prescribed percentage, ≥10%, of EC2s are shared, a second prescribed percentage, ≥25%, of Lambda functions are shared, etc.) and the relationships do not warrant separation, the cloud architectures are merged to form a new cloud architecture. These reduction operations are iterative, until the cloud architectures have been evaluated and a subset of these cloud architectures are ready for rendering.

As an illustrative example, a first cloud architecture may feature three (3) Lambda functions while a second cloud architecture may feature four Lambda functions, inclusive of the three Lambda functions operating as part of the first cloud architecture. Where the fourth Lambda function would be compatible (and have little effect in the overall operability) with the first cloud architecture, these cloud architectures may be merged for render a cloud architecture featured as a combination of the first and second cloud architectures. However, where the fourth Lambda function is incompatible with the first cloud architecture, such as the fourth Lambda function is communicatively coupled to thousands of other resources, these may constitute a significant distinction to keep the cloud architectures separate. Other compatibility determinations may be based on analytics associated with different metrics such as user roles, permissions, and conflicting policies.

The architecture rendering component 370 is further configured to generate graphical representations of the cloud architectures, where edge lines are used to represent relationship and communications between different cloud resources illustrated as nodes forming the cloud architecture.

Figure 5:
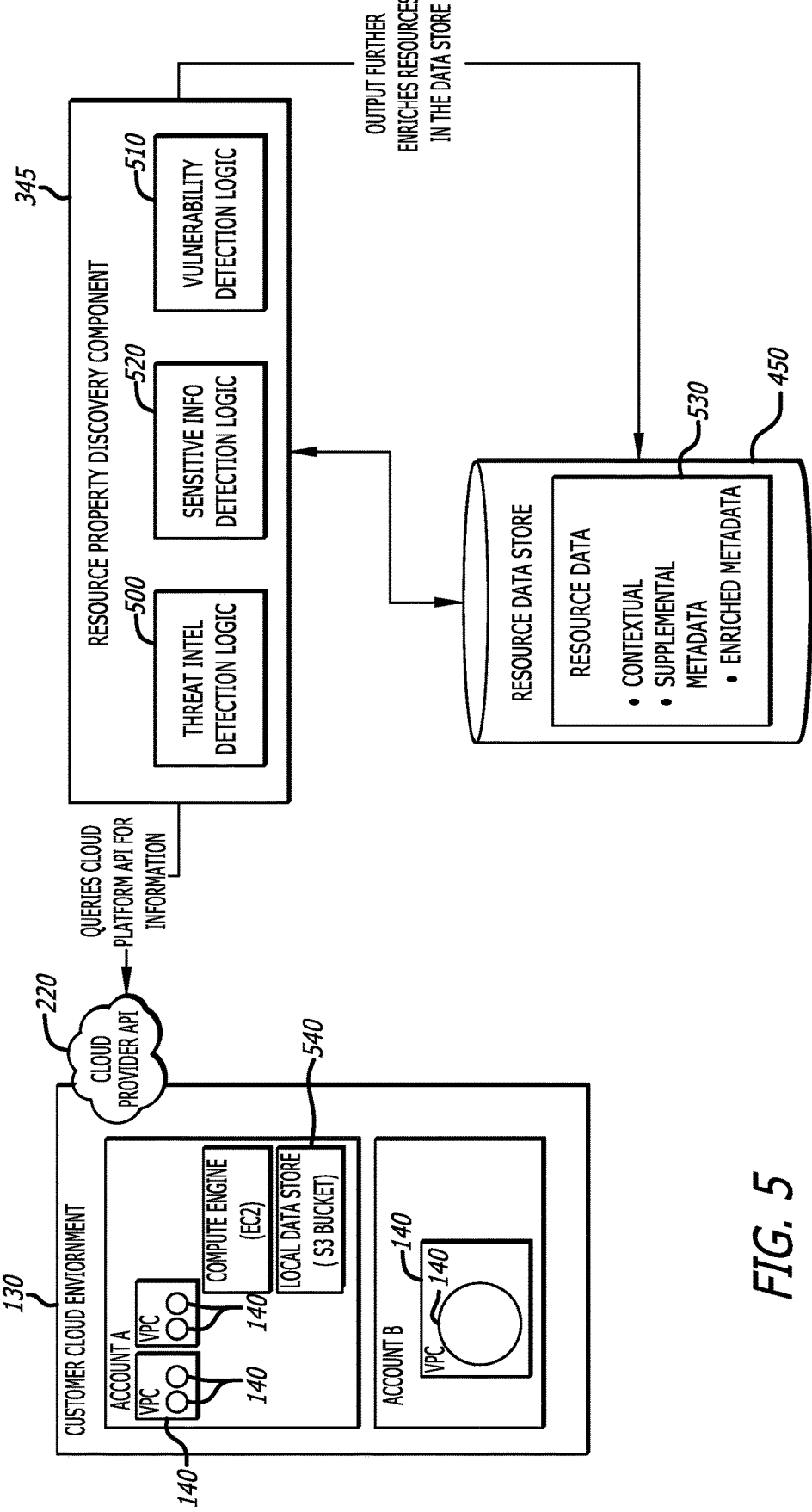
FIG. 5 illustrates a block diagram of a resource property discovery component of the cloud security system of FIG. 3 to identify threat intelligence, presence of sensitive information, or vulnerabilities associated with the cloud and/or network resources.

Referring now to FIG. 5, a block diagram of an exemplary embodiment of the resource property discovery component 345 of FIG. 3 is shown. Herein, the resource property discovery component 345 is configured to identify (i) cloud provider threat intelligence available to the customer cloud environment 130, (ii) sensitive information stored within the cloud resources 140, and/or (iii) vulnerabilities possessed by the cloud resources 140. The information associated with the threat intelligence, sensitive data storage, and/or vulnerabilities are provided as enriched metadata for the cloud resources to which this information pertains.

More specifically, the resource property discovery component 345 features threat intelligence detection logic 500, vulnerability detection logic 510, and sensitive information detection logic 520. The threat intelligence detection logic 500 may be configured to access cloud resources 140 within the cloud environment 130 via the cloud provider API 220 in order to collect existing threat intelligence maintained by a cloud provider offering the customer cloud environment 130. The threat intelligence may include information associated with advanced persistent threats (APTs) being monitored for or attempted on the cloud environment 130. For example, the threat intelligence detection logic 500 may be configured to collect threat intelligence that identifies certain types of cloud resources within the customer cloud environment 130 that have been historically targeted for cyberattacks. This threat intelligence is collected and storage as enriched metadata 530 for content pertaining to the cloud resource that is stored within the resource data store 450.

The vulnerability detection logic 510 may be configured to access the cloud provider API 220 in order to in order to collect information pertaining to vulnerabilities associated with the cloud resources 140 and/or cloud architectures inclusive of the vulnerable cloud resources. For example, the vulnerability detection logic 510 may be configured to conduct analytics of metadata associated with the cloud resources 140 to determine potential vulnerabilities associated with one or more of these cloud resources 140, where the analytic results may be provided as part of the enriched metadata 530. For example, the vulnerability detection logic 510 may be configured to determine which of the cloud resources 140 are accessible to a public network or which of the cloud resources 140, if any, includes expired digitals certificates that may subject them to various cyber threats. Additionally, example, the vulnerability detection logic 510 may be configured to determine which of the cloud resources 140 include outdated security modules or a version of the operating system (OS) with certain known vulnerabilities.

The sensitive information detection logic 520 is configured to identify cloud resources operating as a logical data store within the customer cloud environment 130, such as AWS™ buckets 540 or other cloud provider logical data stores for example, which store sensitive information. The sensitive information may include password(s), confidential financial document(s), or other information that is deemed to cause damage to the enterprise if exposed. The presence of sensitive information within a particular cloud resource may be learned by the sensitive information detection logic 520 and the presence of the sensitive information indicated (e.g., setting a tag), which is provided as part of the enriched metadata 530 for that resource stored in the resource data store 450.

Figure 6:
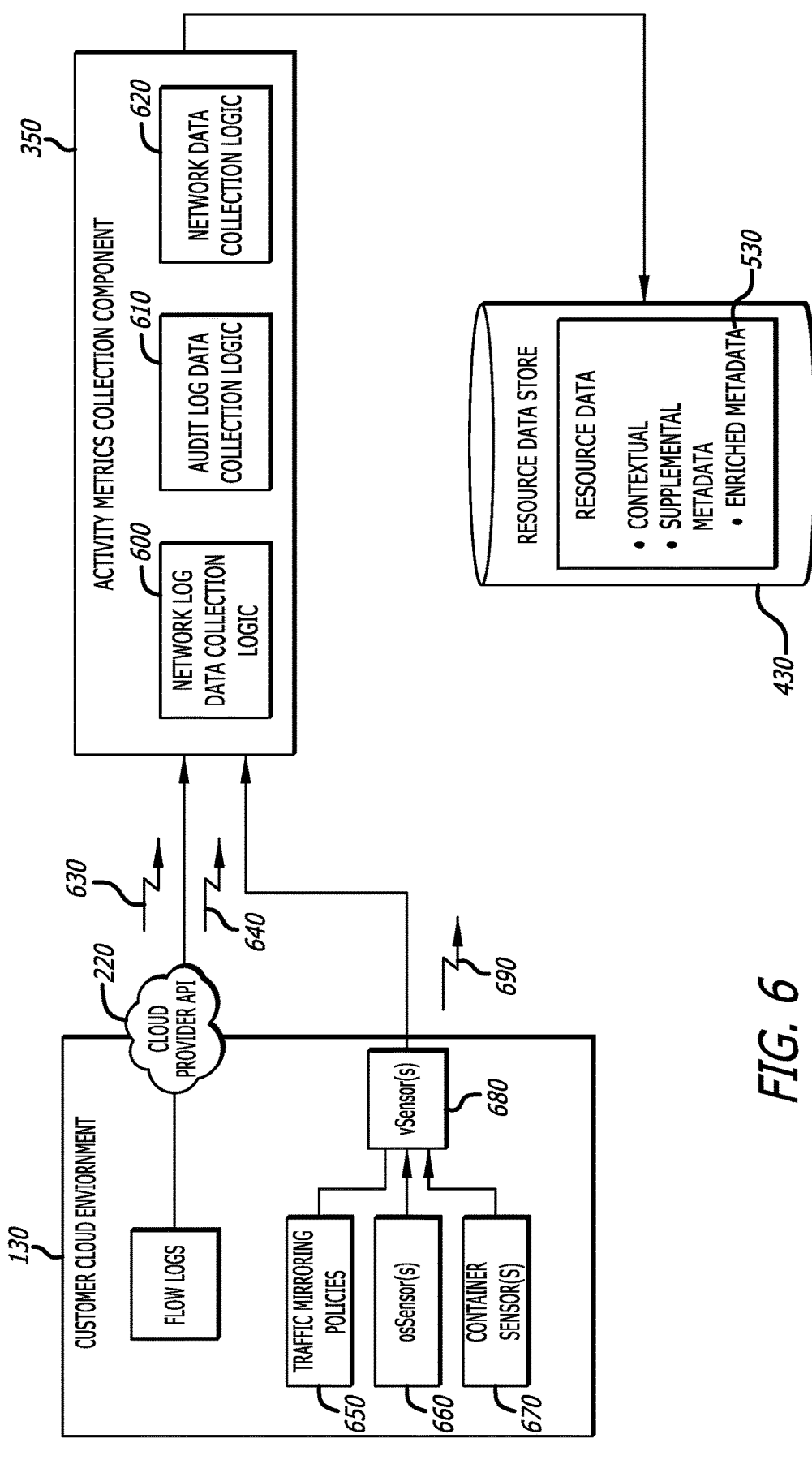
FIG. 6 illustrates a block diagram of an activity metrics collection component of the cloud security system of FIG. 3 to identify activity-based resources such as network logs, audit logs, and/or network data.

Referring now to FIG. 6, a block diagram of the activities metric collection component 350 of the cloud security analytics subsystem 300 of FIG. 3 is shown. In general, the activities metric collection component 350 is configured to determine how cloud resources behave within the customer cloud environment 130 based on collected log data and/or network data. According to one embodiment of the disclosure, the activities metrics collection component 350 features (i) network log data collection logic 600, (ii) audit log data collection logic 610, and (iii) network data collection logic 620.

The network log data collection logic 600 is configured to collect network addresses 630 (or domains) associated with cloud resources in communication with the customer cloud environment 130. For example, the network log data collection logic 600 may be configured to acquire Internet Protocol (IP) addresses associated with computing devices in communication with the network-based cloud resource such as a VPC.

The audit log data collection logic 610 is configured to access stored audit log data 640 that corresponds to data pertaining to users accessing any of the cloud resources 140 within the customer cloud environment 130. The audit log data 640 may include user profile metadata and/or user role metadata for example. The audit log data 640 is retrieved by the audit log data collection logic 610 and subsequently provided to the resource data store 450 as part of the enriched metadata 530 to populate the stored metadata pertaining to the accessed cloud resource to which the audit log data 640 pertains.

The network data collection logic 620 is configured to identify IP addresses associated with network traffic data monitored by traffic mirroring policies 650, osSensors 660 or container (Kubernetes) sensor 670, which are provided to a vSensor 680 positioned within the customer cloud environment 130. The network data collection logic 620 acquires metadata 690 associated with network traffic data via the vSensor 680, where the metadata 690 is representative of cloud resource behavior based on the network traffic data. For example, from the acquired metadata 690, the network data collection logic 620 may identify that certain cloud resources are in communications with a specific domain (e.g., CompanyABC.com), which resides at a specific geographic region, communicates with the cloud resource at specific times of the day (per timestamp), and the like. The acquired metadata 690 associated with network traffic data may be collected by the network data collection logic 620 and provided to the resource data store 450 to be included as part of the enriched metadata 530 provide further context to understand the behavior of cloud resources and/or cloud architectures being the destination or source of the network traffic data.

Figure 7:
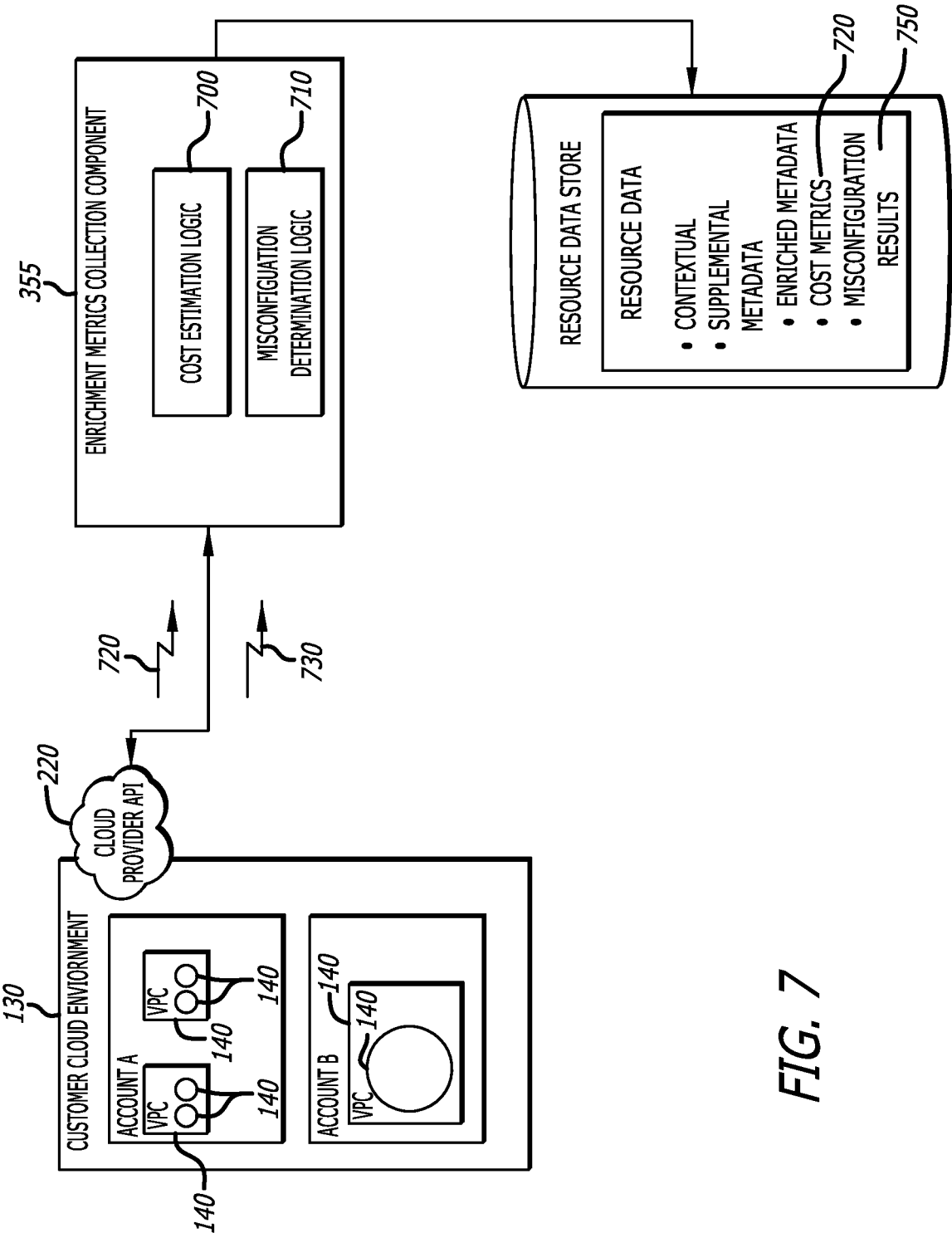
FIG. 7 illustrates a block diagram of an enrichment metrics collection component of the cloud security system of FIG. 3 to determine cost estimates and/or setting misconfiguration associated with the cloud and/or network resources.

Referring now to FIG. 7, a block diagram of the enrichment metrics collection component 355 of the cloud security analytics subsystem 300 of FIG. 3 is shown. The enrichment metrics collection component 355 is configured to perform cloud security posture management (CSPM) by at least conducting analytics on information associated with the cloud resources 140 within the customer cloud environment 130 and/or the cloud architectures each associated with a set of these cloud resources 140 in order to detect compliance and/or misconfiguration of these cloud resources. Additionally, the enrichment metrics collection component 355 may be configured to (i) perform Kubernetes security posture management (KSPM) to determine compliance and/or misconfiguration within a Kubernetes cluster within the customer cloud environment 130 and (ii) cost analytics associated with a particular cloud resource and/or a particular cloud architecture after generation by the architecture creation component 365.

Herein, according to one embodiment of the disclosure, the enrichment metrics collection component 355 features cost estimation logic 700 and misconfiguration determination logic 710 that performs CSPM and/or KSPM operations. The cost estimation logic 700 may be configured to access the cloud provider resources via the cloud provider API 220 in order to acquire cost metrics associated with the cloud resources 140 that are maintained within the customer cloud environment 130. Examples of the cost metrics may include, but is not limited or restricted to costs associated with usage of compute engines, logical data stores or other resources that are monetized by the cloud provider.

Based on these acquired cost metrics 720, the cost estimation logic 600 may be able to identify and potentially rank those cloud resources and/or cloud architectures (determined by a summation of the set of cloud resource costs) that are more costly to deploy than others. This enables network administrators to identify costs, on a cloud architecture granularity, to allow the network administrators to understand the overall costs associated with the customer cloud environment 130 and initiate effective cost-cutting measures as needed. The cost metrics 720 may be assigned to the cloud resources and/or cloud architectures and provided to the resource data store 450 for storage.

The misconfiguration determination logic 710 is configured to assess properties associated with each of the cloud resources 140 to determine whether any of these properties have been incorrectly set. Herein, according to one embodiment of the disclosure, a misconfiguration for a first cloud resource may be identified by the misconfiguration determination logic 710 acquiring parameters 730 associated with the properties of the first cloud resource and comparing the acquired parameters 730 to a set of known misconfiguration parameters for that resource type. Alternatively, according to another embodiment of the disclosure, a misconfiguration for a first cloud resource may be identified by the misconfiguration determination logic 710 acquiring the parameters associated with properties of the first cloud resource and comparing the acquired parameters to parameter settings in accordance with best industry practices for that resource type. The misconfiguration results 750 are provided to the resource data store 450.

As an illustrative example, a first cloud resource may feature an insecure setting. For instance, the first cloud resource may constitute a logical data store, such as an AWS S3 component, which is set to a "public" designation. As a result, the stored data with the S3 component is accessible to the public. In contrast with best industry practices, the S3 component should be set to a "private" designation. As another illustrative example, a first cloud resource may feature an outdated software instance (e.g., OS instance, device driver instance, etc.) that should have been updated in an enterprise-wide software update.

The acquired cost metrics 720 and/or misconfiguration results 750 determined by the enrichment metrics collection component 355 are provided to the resource data store 450 to provide further context to understand the behavior of corresponding cloud resources and/or cloud architectures pertaining to the cost metrics and/or misconfiguration.

Referring to FIG. 8, a block diagram of an exemplary embodiment of the risk assessment component 360 of the cloud security analytics subsystem 300 of FIG. 3 is shown. The risk assessment component 360 is configured to determine risk levels associated with each cloud resource and/or cloud architectures formed by a set of the cloud resources. Herein, according to this embodiment, the risk assessment component 360 features (i) resource risk determination logic 800, (ii) architecture risk determination logic 810, and (iii) misconfiguration risk determination logic 820.

Herein, the resource risk determination logic 800 is configured to generate a risk value 830, which represents the potential risk of the cloud resource being subjected to a cyber threat or compromised by a cyberattack. In determining the cloud resource risk value 830, a number of parameters are considered. These parameters may include, but are not limited or restricted to the following: (a) the age of the cloud resource 831 (as older cloud resources may be more susceptible to cyber threats than newer resources that may feature heightened security functionality); (b) the type of cloud resource 832 (as certain types of resources are less susceptible to attack, while others, such as logical data stores for example, are more susceptible to a cyber threat); (c) impact tags 833 (weighting values set by the enterprise to identify cloud resources that the enterprise considers important to its overall cloud environment operability to allow customers to be able to participate in the cloud resource risk level settings); (d) the oddity score 834 (a measure of how unusual or different the cloud resource is when compared to other resources to identify anomalous cloud resources that may already be subjected to a cyber threat); and/or (e) the model breaches 835 (identify cloud resources that may be susceptible to cyber threats through modeling).

Herein, these risk values 830 may be utilized in an aggregated distribution (e.g., an average or weighted average, summation, or other arithmetic-based computation) in the generation of cloud architecture risk values 840 and/or misconfiguration risk values 850 as described below.

The architectural risk determination logic 810 may be configured to compute a cloud architecture risk value 840, which represents the potential risk of the cloud architecture (i.e., a set of cloud resources) being subjected to a cyber threat or compromised by a cyberattack. In determining the cloud architecture risk value 840, a number of parameters are considered such as aggregated distributions of both a portion of the cloud resource risk values 830 that pertain to the cloud resources being part of the cloud architecture and a portion of the misconfiguration risk values 850 generated by the misconfiguration risk determination logic 820 as described below.

More specifically, according to one embodiment of the disclosure, the aggregated distributions may include (i) a weighted average 841 of the cloud resource risk values 830 for the cloud resources forming the cloud architecture and (ii) a weighted average 842 of misconfigured risk values 850 for the cloud resources forming the cloud architecture. The weighting may be conducted by applying a larger weighting value on those cloud resources having the highest risk levels in comparison to other cloud resources in the cloud architecture. This may align the cloud architecture risk to be more correlated to the riskier cloud resources.

In addition to the aggregated distributions, the cloud architecture risk value 840 may be based, at least in part, on a third parameter (impact tags) 843. When set (or altered) by a network administrator for the enterprise, the impact tags 843 allow the enterprise (or customer) to place importance on certain cloud architectures and/or certain cloud resources that may be included as part of a cloud architecture. The impact tags 843 apply further weighting based on a customer's perception as to what important to the customer and deserve a higher weighing as to protective risk in confirming that these resources are monitored more closely than other resources.

Referring still to FIG. 8, the misconfiguration risk determination logic 820 is configured to generate the misconfiguration risk value 850 based on one or more parameters. These parameter(s) may include a baseline risk 851 and a resource risk 852. The baseline risk 851 in the context of misconfigurations is a statically assigned value given to each misconfiguration type when a rule utilized by the misconfiguration risk determination logic 820 is created. The rule may be created by a human analyst or through an automated process based on heuristic analytics associated with known misconfigurations. The resource risk 852, on the other hand, is the risk value 830 of the cloud resource having the misconfiguration.

The above-described risks may be included as part of the cloud resource and/or cloud architecture metadata to be included as part of the graphical display and to coordinate a risk-based display hierarchy for the cloud resources and/or cloud architectures.

Figure 9:
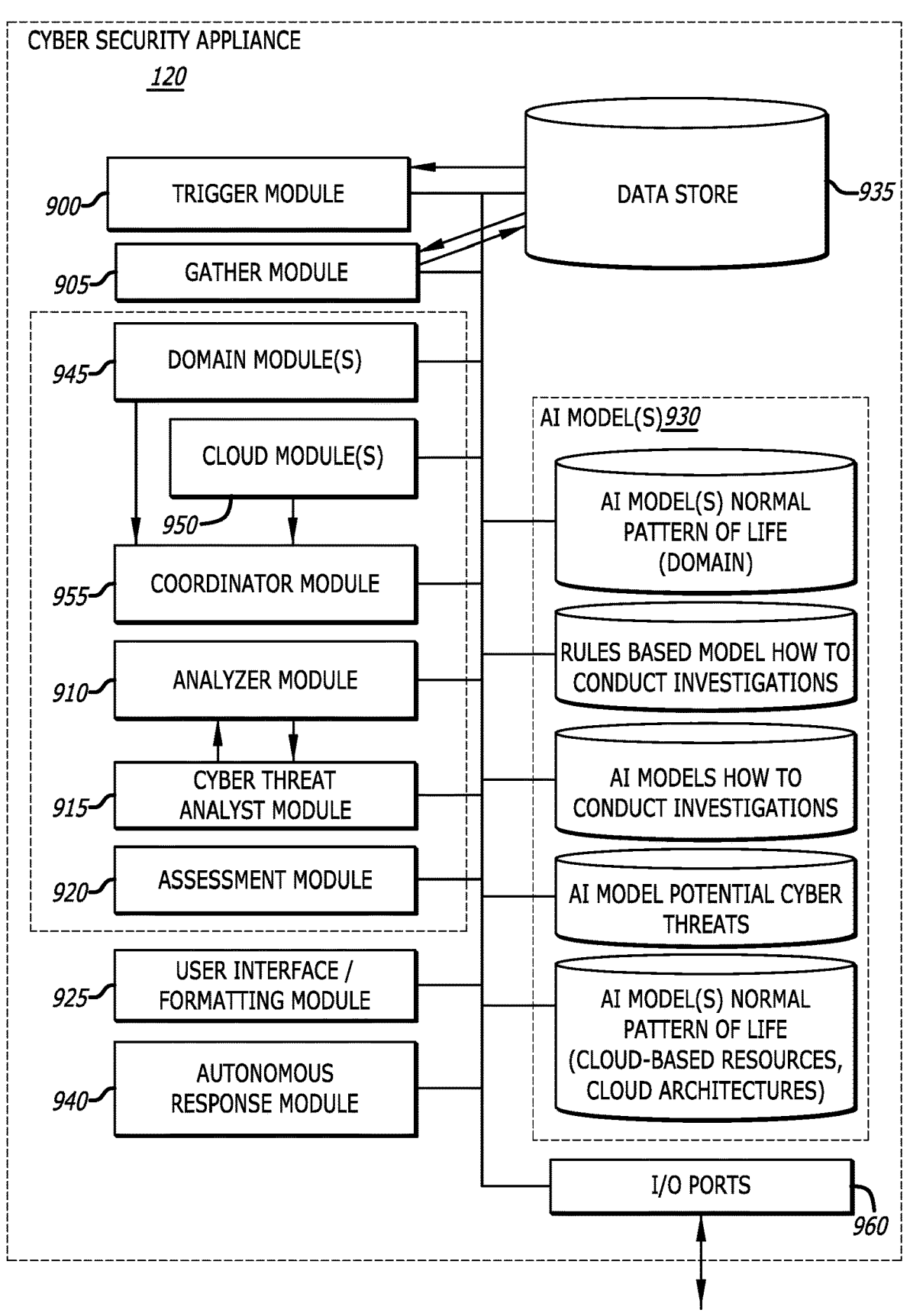
FIG. 9 illustrates a block diagram of an embodiment of the AI-based cyber security appliance of FIGS. 1A-1B.

Referring now to FIG. 9, a block diagram of an exemplary embodiment of the AI-based cyber security appliance 120 of FIGS. 1A-1B is shown. The AI-based cyber security appliance 120 is configured to protect the enterprise, including but not limited to its customer cloud environments, from cyber threats. Various logic and components, such as AI-based models and modules of the cyber security appliance 120, cooperate to protect the customer cloud environment under analysis from cyber threats.

According to one embodiment of the disclosure, the AI-based cyber security appliance 120 may include a trigger module 900, a gatherer module 905, an analyzer module 910, a cyber threat analyst module 915, an assessment module 920, a formatting module 925, one or more AI models 930, a data store 935, an autonomous response module 940, domain module(s) 945, cloud module(s) 950, and/or a coordinator module 955. Herein, the AI models 930 are trained with machine learning on (i) a normal pattern of life for entities in the network/domain/cloud under analysis, notably the identified cloud resources and/or cloud architectures, (ii) cyber threat hypotheses to form and investigate a cyber threat hypothesis on what are a possible set of cyber threats and their characteristics, symptoms, remediations, etc., and/or (iii) possible cyber threats.

The cyber security appliance 120 is configured to protect a network/domain/cloud from a cyber threat (insider attack, malicious files, malicious emails, etc.). In an embodiment, the cyber security appliance 120 can protect all of the devices on the network(s)/domain(s)/cloud environment(s) being monitored based on activity, for example, on an individual basis from monitoring communications going to and from the computing device on the network and/or cloud resources 140 within the cloud environment 130 of FIGS. 1A-1B. For example, via I/O ports 960, a domain module 945 may communicate with network sensors to monitor network traffic to and from the cloud environment as well as receive secure communications from software agents embedded in computing devices/containers. The steps below will detail the activities and functions of several of the components in the cyber security appliance 120.

The data gather module 905 may have a series of one or more process identifier classifiers. A process identifier classifier can identify and track each process and device in the network or the cloud environment, under analysis, making communication connections. The data store 935 may be configured to cooperate with the process identifier classifier to collect and maintain historical data of processes and their connections, which is updated over time as the network is in operation. In an example, the process identifier classifier can identify each process running on a given device along with its endpoint connections, which are stored in the data store.

The analyzer module 910 is configured to cooperate with AI model(s) 930 or other modules in the cyber security appliance 120 to confirm a presence of a cyber threat attacking one or more domains in an organization's system and/or one or more cloud resources within a cloud environment. A cyber threat analyst module 915 is configured to cooperate with the AI model(s) 930 and/or other modules in the cyber security appliance 120 to conduct a long-term investigation and/or a more in-depth investigation on potential cyber threats attacking domain(s) and/or cloud environment in the enterprise security system 105. An algorithm in the analyzer module 910 can cooperate with the data gatherer module 905 to collect any additional data and metrics to support a possible cyber threat hypothesis. The analyzer module 910 and/or the cyber threat analyst module 915 can also look for other anomalies, such as model breaches, including, for example, deviations for a normal behavior of an entity, and other techniques discussed herein. The analyzer module 910 and/or the cyber threat analyst module 915 can cooperate with the AI models 930 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module 915 can cooperate with the internal data sources as well as external data sources to collect data in its investigation.

The cyber threat analyst module 915 in essence allows two levels of investigations of potential cyber threat attacks. In a first level, the analyzer module 910 and AI models 930 can rapidly detect and then autonomously respond to overt and obvious cyber threats. However, thousands to millions of low level anomalies occur in a domain or cloud environment under analysis all of the time; and thus, most other systems need to set the threshold of trying to detect a cyber threat at level higher than the low level anomalies examined by the cyber threat analyst module 915 just to not have too many false positive indications of a cyber threat attack when one is not actually occurring, as well as to not overwhelm a human cyber analyst receiving the alerts with so many notifications of low level anomalies that they just start tuning out those alerts. However, advanced persistent threats attempt to avoid detection by making these low-level anomalies in the system over time during their attack before making their final coup de grace/ultimate mortal blow against the domain or cloud environment being protected. The cyber threat analyst module 915 conducts investigations over time that can detect these advanced persistent cyber threats actively trying to avoid detection by looking at one or more of these low-level anomalies as a part of a chain of linked information.

The cyber threat analyst module 915 is configured to form and investigate hypotheses on what are a possible set of cyber threats and can also cooperate with the analyzer module 910 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 930 trained with machine learning on the normal pattern of life of entities in the system. The cyber threat analyst module 915 may be configured to submit to check and recheck various combinations/a chain of potentially related information under analysis until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted; and thus, needs a human to further investigate the anomaly of interest included in the chain of potentially related information.

It is contemplated that a data analysis process or any analytics can be conducted by algorithms/scripts to perform their function discussed herein; and can in various cases use AI classifiers as part of their operation. It is further contemplated that any portions of the AI-based cyber security appliance 120 or the cyber security system 150, when implemented as software, can be stored in one or more non-transitory memory storage devices in an executable format to be executed by one or more processors.

Again, an input from the cyber threat analyst module 915 of a supported hypothesis of a potential cyber threat will trigger the analyzer module 910 to compare, confirm, and act on that cyber threat. In contrast, the cyber threat analyst module 915 is configured to investigate subtle indicators and/or initially seemingly isolated unusual or suspicious activity such as a worker is logging in after their normal working hours or a simple system misconfiguration has occurred. Most of the investigations conducted by the cyber threat analyst module 915 on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 915 may occur before the algorithms in the cyber threat analyst module 915 determines whether a particular cyber threat hypothesis is supported, refuted, or needs further investigation by a human. The rounds of data gathering build chains of linked low level indicators of unusual activity along with potential activities that could be within a normal pattern life for that entity to evaluate the whole chain of activities to support or refute each potential cyber threat hypothesis formed. The investigations by the cyber threat analyst module 915 can happen over a relatively long period of time and be far more in depth than the analyzer module 910 which will work with the other modules and AI model(s) 930 to confirm that a cyber threat has in fact been detected.

The gatherer module 905 may further extract data from the data store 935 at the request of the cyber threat analyst module 915 and/or analyzer module 910 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gatherer module 905 cooperates with the cyber threat analyst module 915 and/or analyzer module 910 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

The cyber threat analyst module 915 is configured to form and investigate hypotheses on what are a possible set of cyber threats and can cooperate with the analyzer module 910 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 930 trained with machine learning on the normal pattern of life of entities in the domains or cloud-based resources (customer cloud environment) under analysis.

Likewise, as further shown in FIG. 9, the gatherer module 905 and the analyzer module 910 cooperate to supply further data and/or metrics requested by the analyzer module 910 when attempting to support or rebut each cyber threat hypothesis. Again, the analyzer module 910 can cooperate with the other modules and AI model(s) 930 to rapidly detect and then autonomously respond to overt and obvious cyber threat attacks, (including ones found to be supported by the cyber threat analyst module 915).

As a starting point, the AI-based cyber security appliance 120 can use the trigger module 900 working with the AI model(s) 930 of the normal pattern of life for the entities in the network/domain or the cloud resources or cloud architectures in the cloud environment under analysis to identify abnormal behavior and/or suspicious activity compared to the normal behavior of that entity, which is supplied to the analyzer module 910 and/or the cyber threat analyst module 915. The analyzer module 910 and/or the cyber threat analyst module 915 may also receive other inputs such as AI model breaches, AI classifier breaches, etc. Note, the trigger module 900 can also receive a trigger to start an investigation from an external source.

Many other model breaches of the AI models 930 trained with machine learning on the normal behavior of the system and/or cloud environment (or resources/architectures thereof) can send an input into the cyber threat analyst module 915 and/or the trigger module 900 to trigger an investigation to start the formation of one or more hypotheses on what are a possible set of cyber threats that could include the initially identified abnormal identified abnormal behavior and/or suspicious activity. Note, a deeper analysis can look at example factors such as i) how long has the component, such as a cloud resource for example existed or is registered; ii) what kind of certificate is the communication using; etc.

Note, the cyber threat analyst module 915 in the AI-based cyber security appliance 120 provides an advantage as it reduces the time taken for human led or cybersecurity investigations, provides an alternative to manpower for small organizations and improves detection (and remediation) capabilities within the cyber security appliance 120.

The cyber threat analyst module 915 that forms and investigates hypotheses on what are the possible set of cyber threats can to use hypotheses mechanisms including any of 1) AI model(s) 930 trained on how human cyber security analysts conduct an investigation on a possible set of cyber threats hypotheses that would include at least an anomaly of interest, 2) one or more scripts outlining how to conduct an investigation on a possible set of cyber threats hypotheses that would include at least the anomaly of interest, 3) one or more rules-based models on an investigation on a possible set of cyber threats hypotheses how to conduct an investigation on a possible set of cyber threats hypotheses that would include at least the anomaly of interest, and 4) any combination of these. Again, the AI model(s) 930 may use supervised machine learning and/or unsupervised learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses.

Referring still to FIG. 9, the autonomous response module 940 is configured to take one or more autonomous mitigation actions to mitigate the cyber threat during the cyberattack. The autonomous response module 940 can reference an AI model trained to track a normal pattern of life for each cloud resource and/or its cloud architecture itself to perform an autonomous act of, for example, restricting a potentially compromised cloud resource or cloud architecture having i) an actual indication of compromise and/or ii) merely adjacent to a known compromised node, to merely take actions that are within that resource's or cloud architecture's normal pattern of life to mitigate the cyber threat.

The chain of the individual alerts, activities, and events that form the pattern including one or more unusual or suspicious activities into a distinct item for cyber threat analysis of that chain of distinct alerts, activities, and/or events. The cyber threat analyst module 915 may reference the one or more machine learning models trained on, in this example, cloud architecture threats to identify similar characteristics from the individual alerts and/or events forming the distinct item made up of the chain of alerts and/or events forming the unusual pattern. In the next step, the assessment module 920 with the AI classifiers, once armed with the knowledge that malicious activity is likely occurring/is associated with a given process from the analyzer module 910, then cooperates with the autonomous response module 940 to take an autonomous action such as i) deny access in or out of the device or the network ii) shutdown activities involving a detected malicious agent, iii) restrict devices and/or user's to merely operate within their particular normal pattern of life, iv) adjust access roles associated with the cloud architecture and/or certain cloud resources such as remove some user privileges/permissions associated with the compromised cloud account, and/or v) conduct offensive countermeasures to disable operations of a malicious server responsible for the malicious activity, such as a cyber threat or an on-going cyberattack.

The autonomous response module 940, rather than a human taking an action, can be configured to cause one or more rapid autonomous actions in response to be taken to counter the cyber threat, which may include disabling a source of the cyber threat (e.g., malicious server(s)). The disabling of the malicious server may be accomplished by disabling its ability to communicate with targeted systems.

Herein, the cyber security appliance 120 is configured for an architecture-based approach to cloud security.

Figure 10:
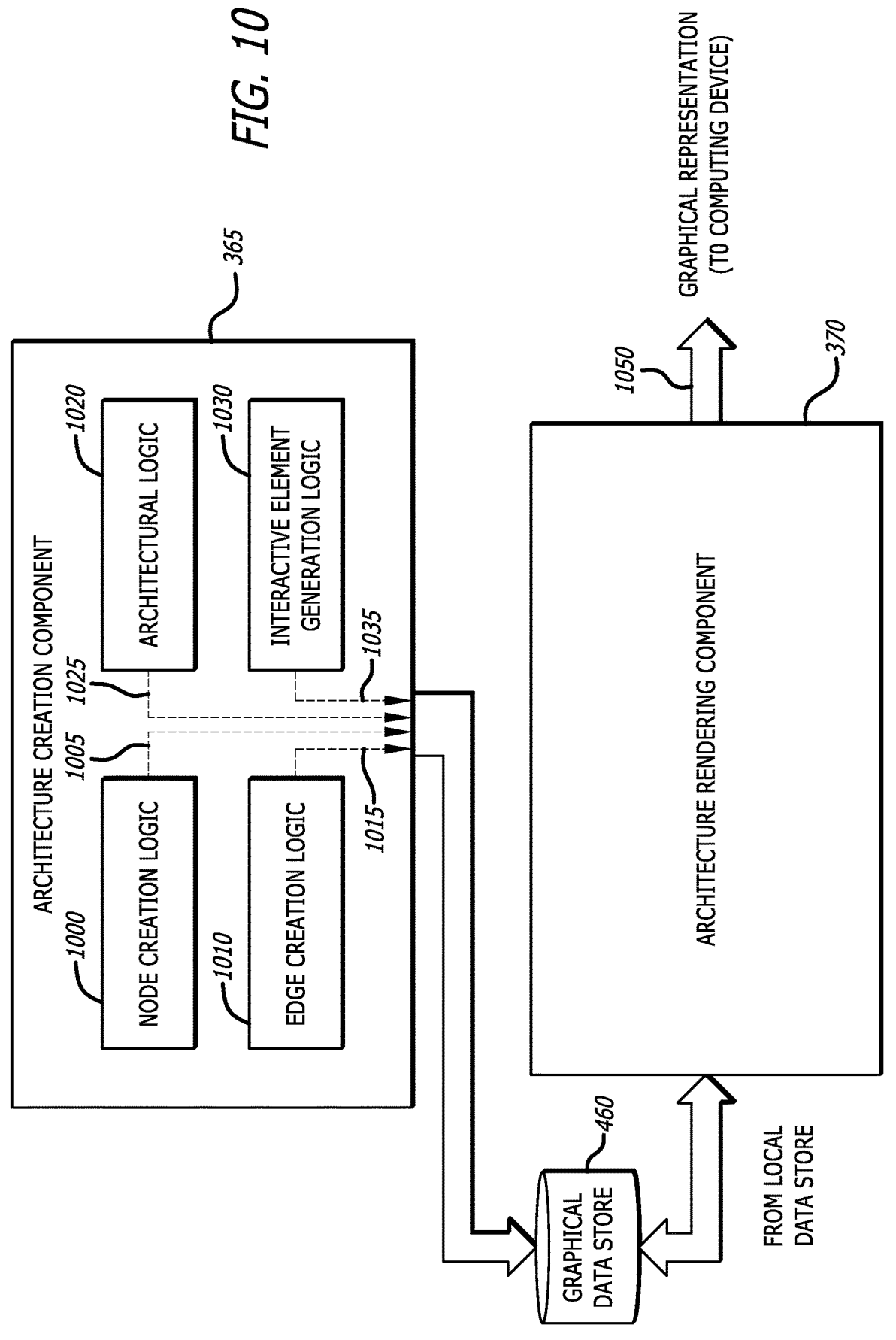
FIG. 10 illustrates a block diagram of an architecture creation component and an architecture rendering component of the cloud security system of FIG. 3 to generate and render visualizations of the cloud environment associated with the customer.

Referring now to FIG. 10, a block diagram of an exemplary embodiment of the architecture creation component 365 and the architecture rendering component 370 of the cloud security system 150 of FIG. 3 is shown. Collectively, the architecture creation component 365 and the architecture rendering component 370 generate and render visualizations of the customer cloud environment 130.

More specifically, the architecture creation component 365 features a node creation logic 1000, edge creation logic 1010, architectural build logic 1020, and/or interactive element generation logic 1030. The node creation logic 1000 is configured to generate node constructs 1005 based on metadata associated with the cloud resources obtained or received by the cloud resource enumeration component 340 of FIG. 3. Additionally, the edge creation logic 1010 is configured to generate edge constructs 1015, each of which includes communication-based information between a node pair and may be represented in the form of an edge (interactive connection) between the node pair. The node constructs 1005 and the edge constructs 1015 may be stored within the graphical data store 460.

According to one embodiment of the disclosure, the architecture creation component 365 may further feature the architectural build logic 1020, which may be configured to generate cloud architecture constructs 1025 based on the node constructs 1005 and the edge constructs 1015. The cloud architecture constructs 1025 are code-based representations of a cloud architecture, where the cloud architecture constructs 1025 may also be stored within the graphical data store 460. Herein, the cloud architecture constructs 1025 may be used to generate visual representations of one or more cloud architectures, each cloud architecture being a set of interconnected nodes.

Referring still to FIG. 10, the interactive element generation logic 1030 is configured to generate constructs 1035 associated with interactive graphical display elements that, upon selection of an interactive graphical display element, causes rendering of the metrics associated with that graphical display element. These graphical display elements may include certain graphical nodes and/or edges produced from their constructs that, when each is rendered, visually display metrics associated with that graphical display element (e.g., metrics displayed within a dialog box). The element constructs 1035 are stored in the graphical data store 460.

As further shown in FIG. 10, the architectural rendering component 370 is configured to access node constructs 1005, the edge constructs 1015, the cloud architecture constructs 1025 stored within the graphical data store and generate a graphical representation of one or more cloud architectures. The architectural rendering component 370 is further configured to perform cloud architecture reduction operations in which some sets of interconnected nodes may be duplicative with nodes of other cloud architectures. As a result, one or more sets of interconnected nodes may be merged with another set of interconnected nodes to generate a cloud architecture for display. This "merging" operation (architecture reduction) is conducted to determine similarities (compatibilities) between these cloud architectures. The similarities may be based on a prescribed amount of node overlap between the two cloud architectures (e.g., percentage of compute engines shared, compute services shared, logical data stores shared, etc.), taking into account shared relationships (e.g., policies, privileges and/or permissions) pertaining to the cloud architectures and/or cloud resources associated with these cloud architectures. This is advantageous by providing a more holistic view of the cloud environment than a greater number of discrete cloud architectures. The architecture reduction operation is iterative, until the cloud architectures have been evaluated and a subset of these cloud architectures 1050 are available for rendering.

Figure 11A:
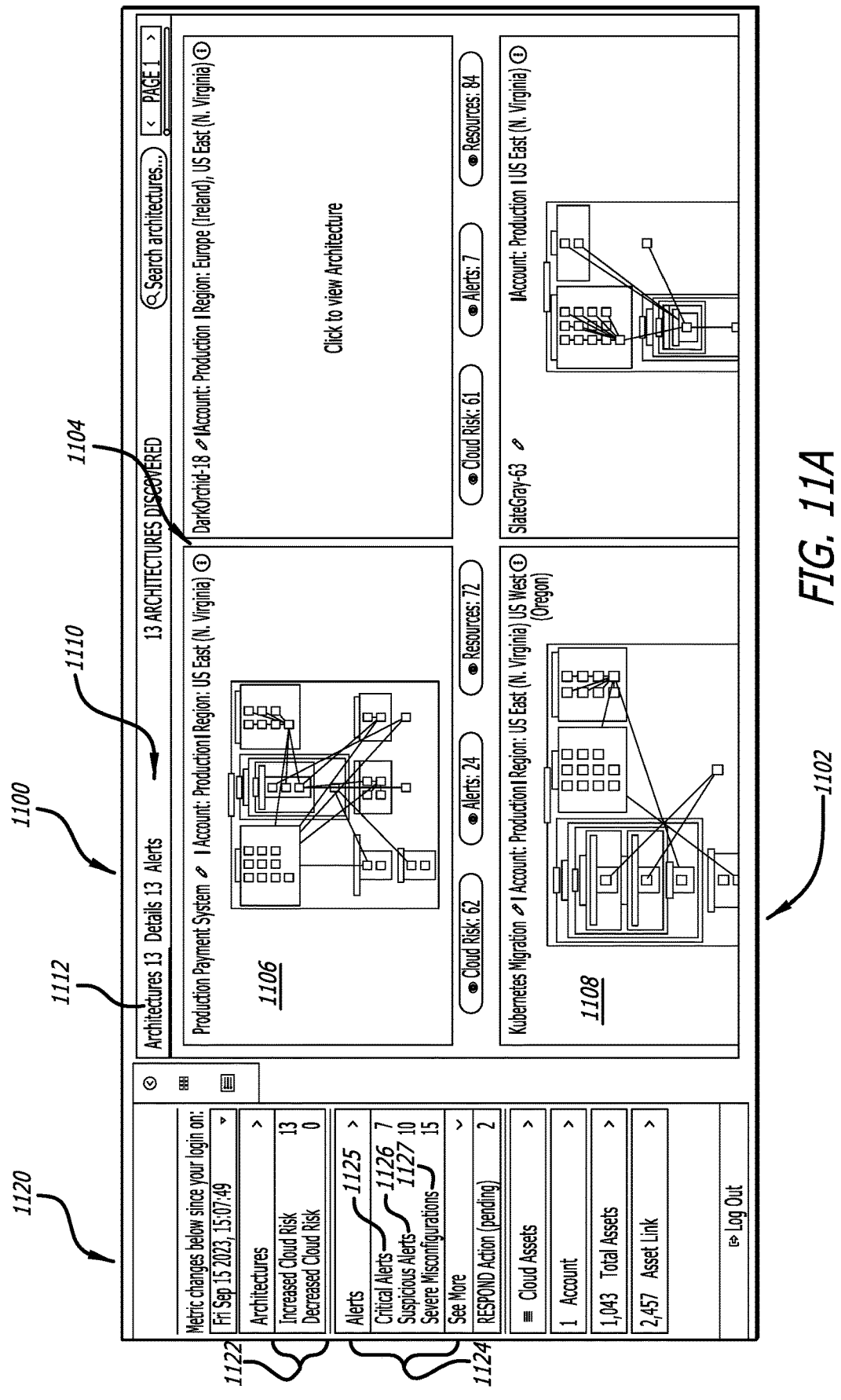
FIG. 11A illustrates exemplary embodiment of a first display layout generated by a graphic user interface (GUI) operating in concert with the architecture rendering component of FIG. 10 is shown.

Referring now to FIG. 11A, an exemplary embodiment of a first display layout 1100 generated by a graphic user interface (GUI) operating in concert with the architecture rendering component 370 of FIG. 10 is shown. Herein, the first display layout 1100 is rendered and visible in response to activation of an "architecture" perspective display element 1112 within a first navigation menu 1110. The first display layout 1100 may feature a display region 1102, the first navigation menu 1110 and a second navigation menu 1120. According to this embodiment of the disclosure, the first navigation menu 1110 is positioned above the display region 1102 and the second navigation menu 1120 is positioned along a side of the display region 1102.

Herein, the display region 1102 features a plurality of cloud architectures 1104, which are generated by the architecture creation component 365 and the architecture rendering component 370 of FIG. 10. Each of the plurality of cloud architectures 1104, such as a first cloud architecture 1106 for example, is based on metadata collected by at least the cloud resource enumeration component 340, the resource property discovery component 345, the activity metric collection component 350, the enrichment metric collection component 355, and/or the risk assessment component 360 of FIGS. 3-6 & 8.

As shown in FIG. 11A, the display region 1102 features the plurality of cloud architectures 1104. These cloud architectures 1104 may be associated with different regions of the cloud environment and/or different sets of cloud resources. For instance, the first cloud architecture 1106 may be directed to a production payment system with cloud resources located in Eastern United States and a second cloud architecture 1108 may be directed to Kubernetes migration with cloud resources located in both the Eastern United States and the Western United States. These cloud architectures 1104 are displayed as a set of nodes interconnected together via edges to allow network administrators to understand the connectivity patterns between cloud resources maintained as part of the cloud architecture.

Also, the second navigation menu 1120 features selectable display elements, including a first display element 1122 that categorizes cloud architectures 1104 based on their cloud architecture risk value and (ii) a second display element 1124 that categorizes alerts based on the risk level. The alerts can be categorized as "critical" alerts 1125 (e.g., alerts pertaining to cloud resources or cloud architectures with the highest risk levels), "suspicious" alerts 1126 (e.g., alerts pertaining to cloud resources or cloud architectures with lower risk levels than the "critical" alerts and/or less time sensitive), and/or misconfiguration alerts 1127 (e.g., alerts pertain to misconfigurations of cloud resources and/or cloud architectures). The first display layout 1100 is generated to enable network administrators to visualize the cloud architectures and access, through categorized alerts, which actions are to be taken soonest.

Figure 11B:
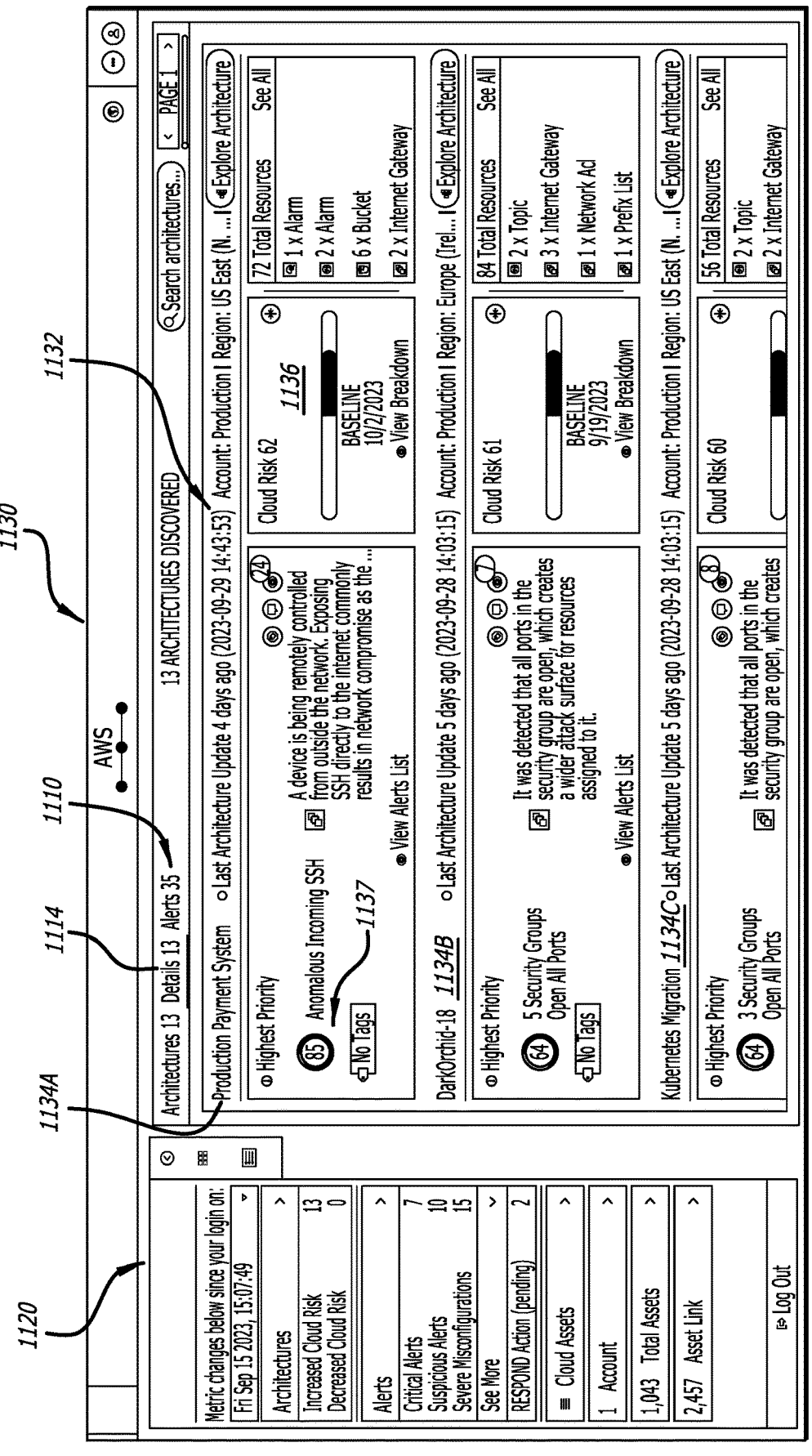
FIG. 11B illustrates an exemplary embodiment of a second display layout rendered and visible in response to activation of a perspective display element within the first navigation menu is shown.

Referring to FIG. 11B, an exemplary embodiment of a second display layout 1130 rendered and visible in response to activation of a "Details" perspective display element 1114 within the first navigation menu 1110 is shown. A display region 1132 features a plurality of regions 1134a, 1134b, 1134c . . . , where each region corresponds to one of the plurality of cloud architectures 1104. Each region (e.g., first region 1134a includes details associated with a particular cloud architecture (e.g., first cloud architecture 1106), such as its cloud architecture risk value 1136 and a representation 1137 (score, identification) of the highest alert associated with the first cloud architecture 1106. The plurality of regions 1134a, 1134b, 1134c associated with the cloud architectures 1104 are organized (top-down) based on the highest cloud architecture risk values.

Figure 11C:
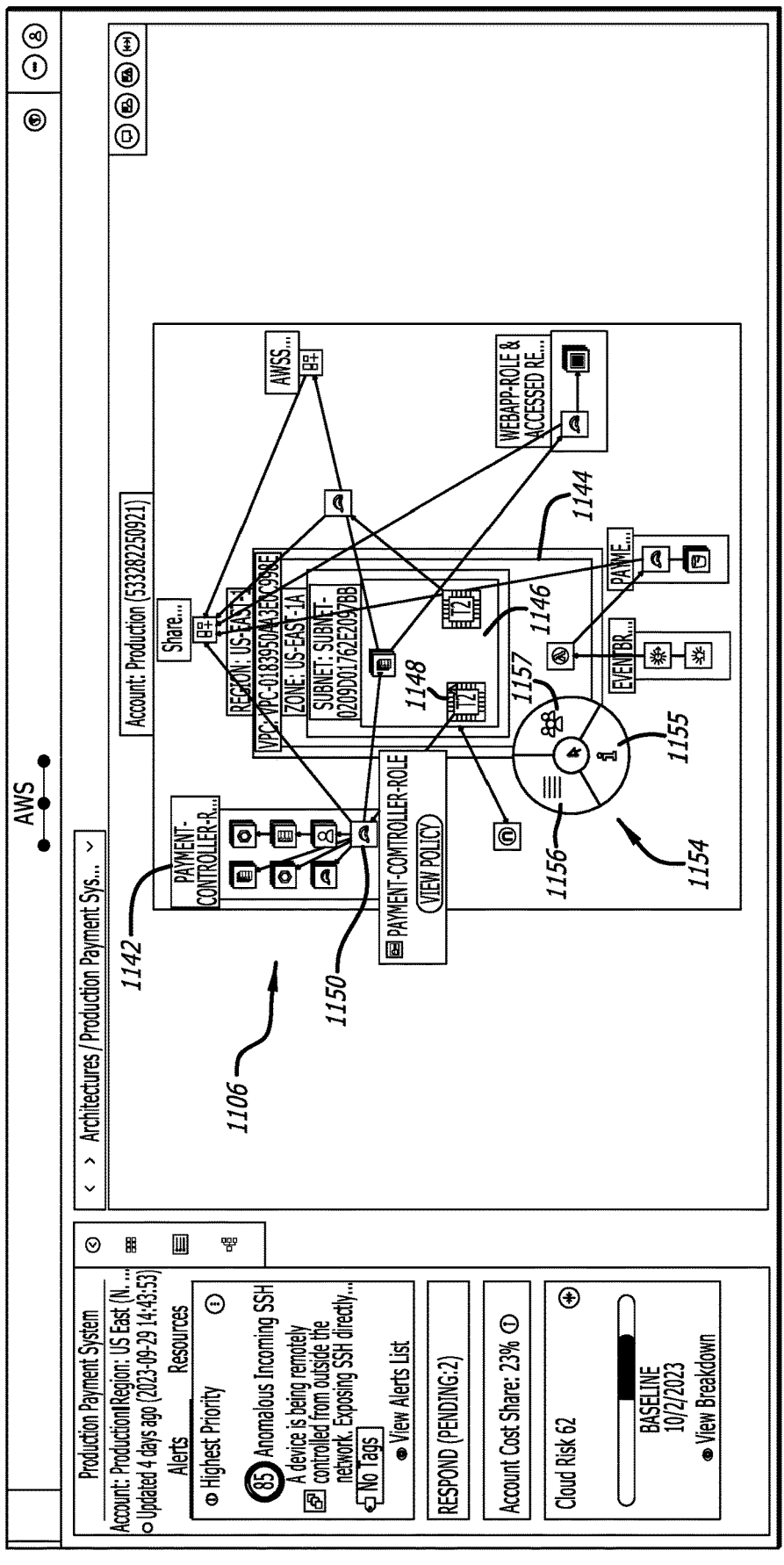
FIG. 11C illustrates an exemplary embodiment of a display layout providing more detailed illustrations of the first cloud architecture (i.e., production payment cloud architecture) of FIG. 11A.

Referring to FIG. 11C, an exemplary embodiment of a display layout 1140 providing more detailed illustrations of the first cloud architecture 1106 (i.e., production payment cloud architecture) of FIG. 11A is shown. Herein, the production payment cloud architecture 1106 features nodes representing cloud resources forming the production payment system, including nodes forming a payment controller 1142, a VPC 1144 encompassing one or more subnets (e.g., subnet 1146), and a compute engine 1148 within the subnet 1146. Some or all of these nodes (cloud resources) are interactive, where selection of a node (cloud resource) causes one or more secondary display elements to be displayed. The secondary display element(s) are provided to illustrate specific metadata associated with that node.

As an illustrative example, selection of an interactive "role" node 1150 associated with the payment controller 1142 generates a secondary display element 1152 that allows for selection and visualization policy information associated with the payment controller 1142. Furthermore, selection of the interactive "compute engine" node 1148 associated with the subnet 1146 generates a secondary display element 1154, which allows selection of multiple data categories such as (i) information (metadata) 1155 associated with the node 1148, (ii) access parameters 1156 identifies which users or cloud resources have access to the cloud resource associated with the node 1148, and/or (iii) log information 1157 as to prior accesses to the node 1148.

Collectively, the display layouts 1100, 1130 and 1140 of FIGS. 11A-11C illustrate a multilayered visualization of the customer cloud environment, where these display layouts 1100, 1130 and 1140 not only provide information as to the cloud resources layout, but also provide information to as who is using and/or has access the cloud architecture, cost metrics are associated with the cloud architectures or certain cloud resources, which cloud resources are exposed to public networks (and may operate as entry points for a cyber threat, what is the purpose of the architecture, ability to install impact tags to the nodes, or the like.

Figure 11D:
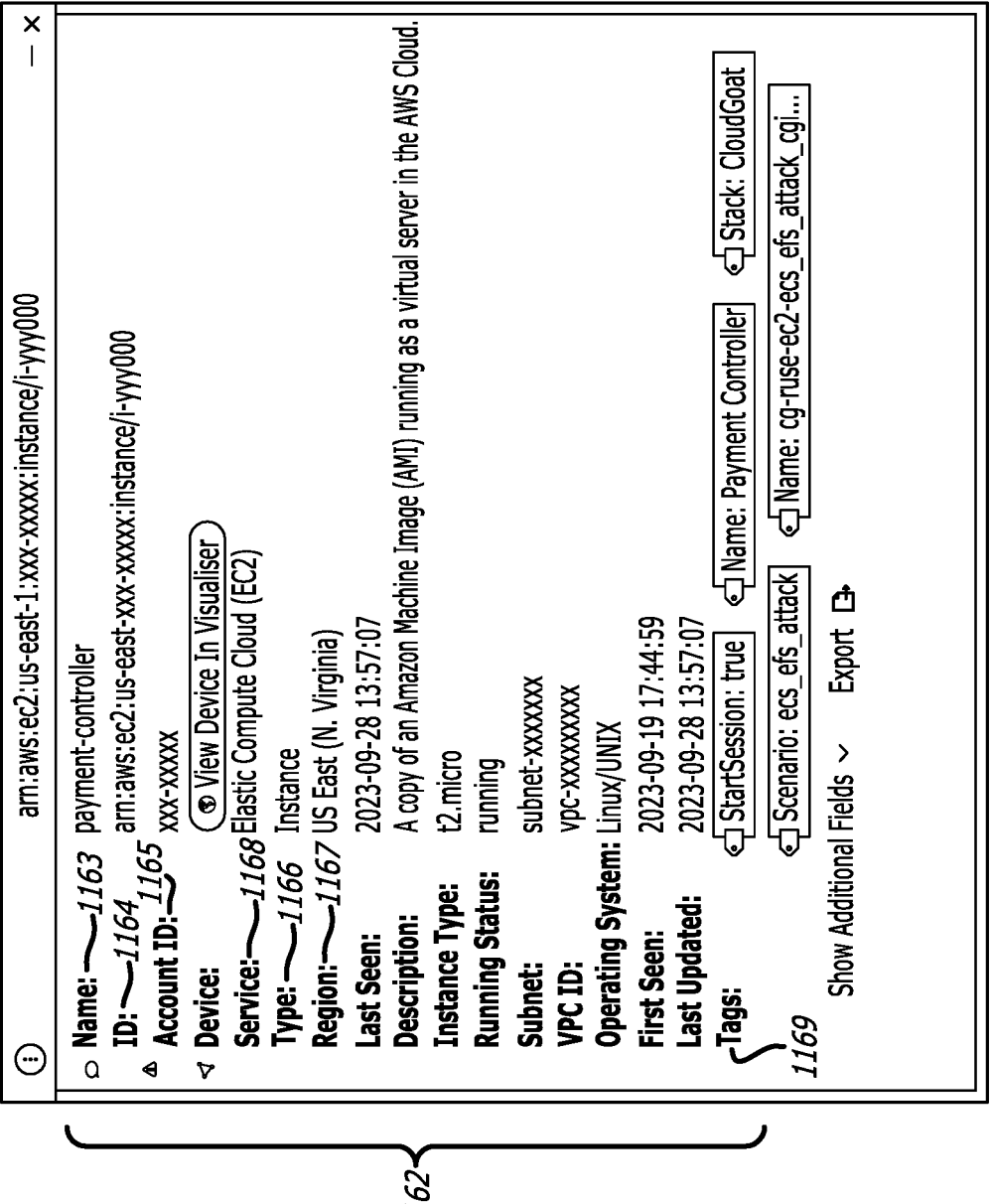
FIG. 11D illustrates more detailed of a display element generated from selection of a region of the secondary display element of FIG. 11C.

Referring to FIGS. 11D, more detailed secondary display element 1160 generated from selection of a region of the secondary display element of FIG. 11C (e.g., "information" region 1155) is shown. Herein, selection of the "information" region 1155 causes illustration of information (metadata) associated with the node 1148. The secondary display element 1160 includes metadata 1162 associated with the compute engine (EC2) represented as the node 1148, including name 1163, cloud service identifier 1164, cloud account identifier 1165, resource type 1166, location 1167, service type 1168, and/or impact tags 1169. Additionally, although not shown, log data may be available. The metadata 1162 provides context as to the characteristics of the "compute engine" node 1148 and, from the metadata, the operability and/or purpose of the cloud resource 1145 may be determined.

Figure 11E:
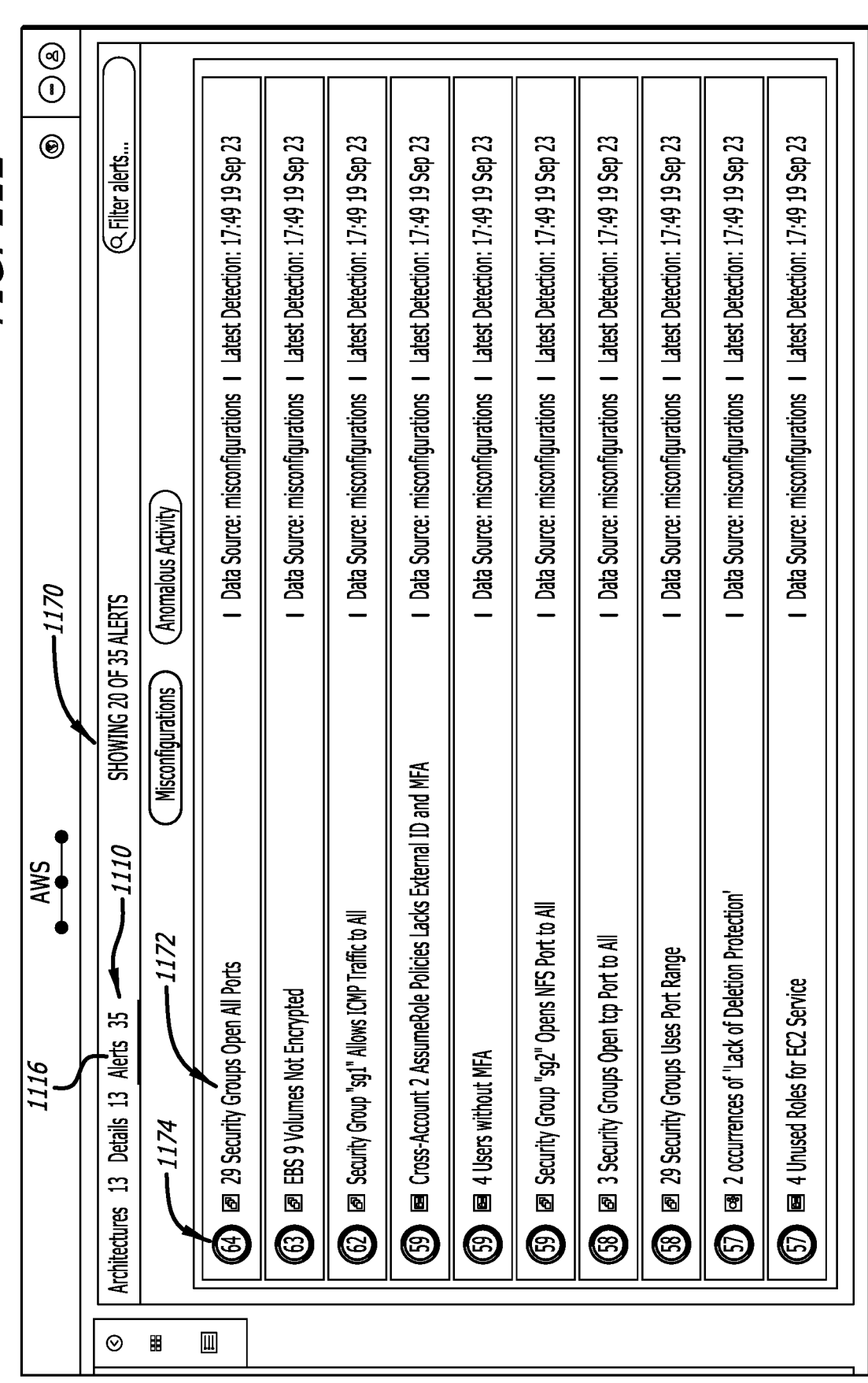
FIG. 11E illustrates a third display layout from an alerts perspective for the plurality of cloud-based architectures of FIG. 11A.

Referring to FIG. 11E, an exemplary embodiment of a third display layout 1170 rendered and visible in response to activation of an "Alerts" perspective display element 1116 within the first navigation menu 1110 is shown. Herein, misconfiguration alerts 1172 are illustrated, categorized by a misconfiguration risk values 1174 assigned to each misconfiguration associated with the customer cloud environment.

Figure 12:
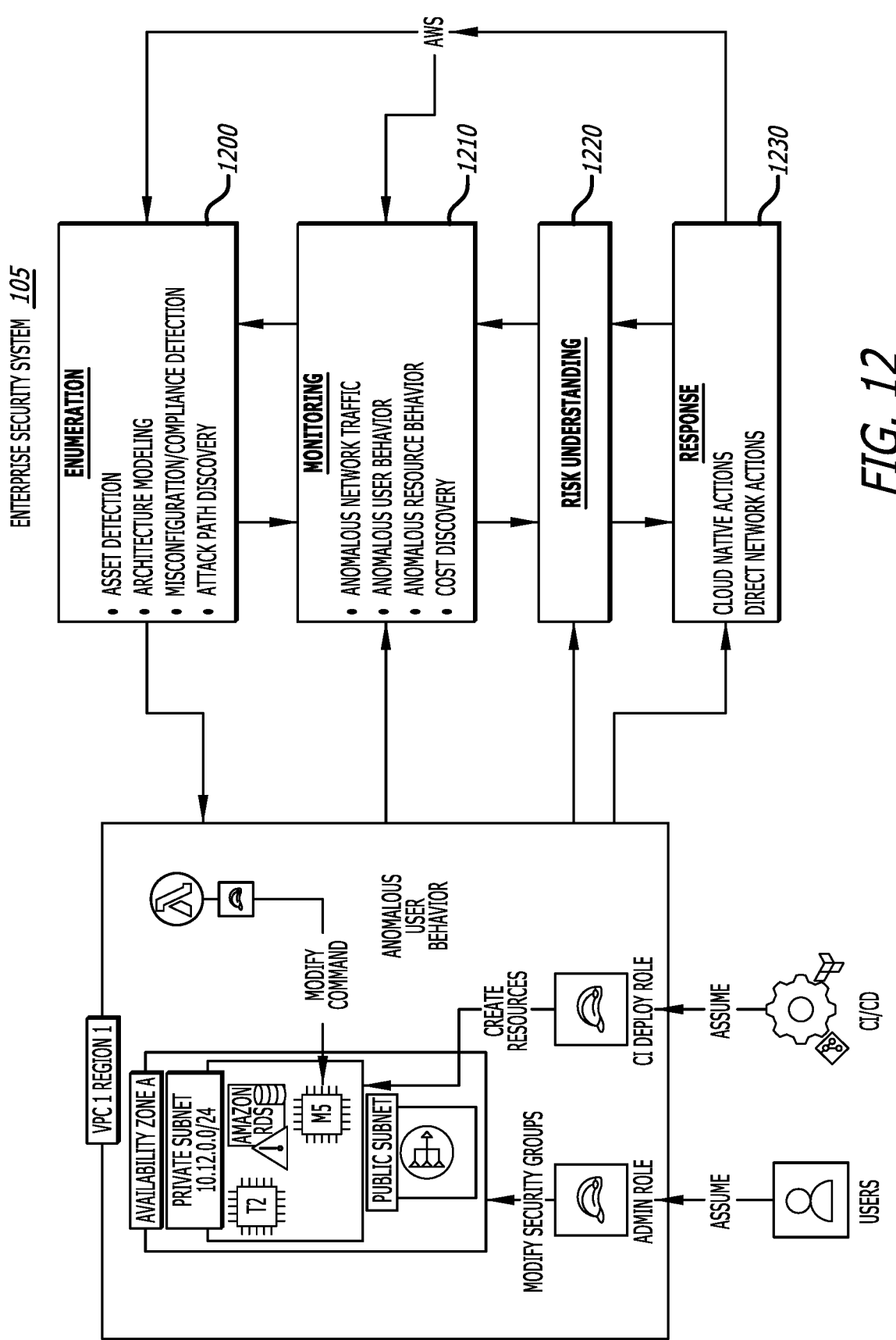
FIG. 12 illustrates a block diagram identifying logical operations performed by the cloud security system of FIG. 3.

Referring now to FIG. 12, a block diagram identifying logical operations performed by the enterprise security system 105 of FIG. 1A is shown. Herein, the cloud security system 150 is configured to perform a number of operations, including enumeration 1200, monitoring 1210, risk understanding (computation, assessment) 1220, and autonomous response 1230 that may involve cloud native actions or direct network actions.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI model(s) 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g. user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At their core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous.

In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US 2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US 2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

The cyber security appliance 100 in a computer builds and maintains a dynamic, ever-changing model of the 'normal behavior' of each user and machine within the system. The approach is based on Bayesian mathematics, and monitors all interactions, events, and communications within the system.

The methods, apparatuses, and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory computer readable mediums in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. Likewise, a component may be implemented in hardware electronic circuits, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An enterprise security system, comprising:
a cyber security system configured to identify a plurality of cloud resources within a customer cloud environment, collect metadata associated with the plurality of cloud resources, and automatically identify one or more cloud architectures assembled from a subset of the plurality of cloud resources associated with the one or more cloud architectures; and
an output system communicatively coupled to the cyber security system over a network interconnect, wherein the output system is configured to receive information pertaining to the one or more cloud architectures for generation of a graphical representation of the one or more cloud architectures, where each component of cyber security system and the output system is implemented with i) electronic circuits, ii) as software stored in one or more non-transitory computer storage mediums and executed by one or more processors, and iii) any combination of i) or ii),
wherein the cyber security system further comprises a resource property discovery component configured to (i) generate a query message for transmission over the network interconnect via an application programming interface (API) of a cloud provider, (ii) obtain threat intelligence gathered by the cloud provider over the network interconnect, the threat intelligence pertaining to the first cloud resource of the customer cloud environment, (ii) augment metadata pertaining to the first cloud resource with the objected threat intelligence, and (iv) store the augmented metadata for storage within a storage subsystem for subsequent analysis by one or more components of the system.

2. The enterprise security system of claim 1, wherein the cyber security system comprises a cloud resource enumeration component configured to (i) identify the plurality of cloud resources within the customer cloud environment, (ii) collect the metadata associated with each of the plurality of cloud resources including a first cloud resource, (iii) conduct access mapping to identify one or more communication paths between at least the first cloud resource and one or more cloud resources of the plurality of cloud resources other than the first cloud resource, and (iv) augment the metadata pertaining to the first cloud resource with information associated with the one or more communication paths for storage within the storage subsystem.

3. The enterprise security system of claim 2, wherein the cyber security system further comprises a resource property discovery component configured to generate a query message via an application programming interface (API) of a cloud provider to obtain threat intelligence gathered by the cloud provider offering the customer cloud environment, the threat intelligence pertaining to the first cloud resource to be added to the metadata pertaining to the first cloud resource for storage within the storage subsystem.

4. The enterprise security system of claim 3, wherein the resource property discovery component is further configured to generate a query message via the cloud provider API to obtain information associated with the first cloud resource being a logical data store of the plurality of cloud resources, and thereafter, determine whether the first cloud resource include sensitive information and include an indicator of a presence of sensitive information within the first cloud resource to the metadata pertaining to the first cloud resource for storage within the storage subsystem.

5. The enterprise security system of claim 3, wherein the resource property discovery component is further configured to generate a query message via the cloud provider API to obtain metadata associated with the plurality of cloud resources to determine whether any of the plurality of cloud resources possesses vulnerabilities.

6. The enterprise security system of claim 2, wherein the cyber security system further comprises an activity metric collection component configured to determine how at least the first cloud resource of the plurality of cloud resources is behaving within the customer cloud environment based on analytics conducted on log data and network traffic data taking in account access controls pertaining to the first cloud resource.

7. The enterprise security system of claim 2, wherein the cyber security system further comprises an enrichment metrics collection component configured to perform cloud security posture management (CSPM) by at least conducting analytics on information associated with the plurality of cloud resources in order to detect compliance or misconfiguration of any of the plurality of cloud resources within the customer cloud environment.

8. The enterprise security system of claim 7, wherein the enrichment metrics collection component is further configured to perform Kubernetes security posture management (KSPM) to determine compliance or misconfiguration within a Kubernetes environment within the customer cloud environment.

9. The enterprise security system of claim 2, wherein the cyber security system further comprises an activity metric collection component configured to perform cost analytics as to costs associated with at least the first cloud resource of the plurality of cloud resources and a cloud architecture of the one or more cloud architectures.

10. The enterprise security system of claim 1, wherein the cyber security system further comprises an architecture creation component configured with (i) node creation logic to generate node constructs for each of the plurality of cloud resources based on metadata corresponding to each of the plurality of cloud resources, (ii) edge creation logic is configured to generate edge constructs for each communicatively coupled node pair, and (iii) architectural build logic configured to generate at least a cloud architecture construct based on the node constructs and the edge constructs, wherein the cloud architecture construct is a code-based representation of a cloud architecture of the one or more cloud architectures.

11. The enterprise security system of claim 10, wherein the cyber security system further comprises interactive element generation logic configured to generate constructs associated with interactive graphical display elements that, upon selection of an interactive graphical display element being a graphical node produced from a node construct of the node constructs or a graphical edge produced by an edge construct of the edge constructs, causes rendering of metrics associated with the interactive graphical display element.

12. A cyber security system for generating a cloud architecture assembled from a plurality of cloud resources within a customer cloud environment based on metadata associated with the plurality of cloud resources, the cyber security system comprising:

a processor;

a non-transitory storage medium communicatively coupled to the processor, the non-transitory storage medium comprises a cloud resource enumeration component configured to (i) identify the plurality of cloud resources and (ii) collect metadata associated with each of the plurality of cloud resources including a first cloud resource for storage within a storage subsystem;

an activity metric collection component configured to determine how at least the first cloud resource of the plurality of cloud resources is behaving within the customer cloud environment based on analytics conducted on log data and network traffic data associated with the first cloud resource;

an enrichment metrics collection component configured to conduct analytics on information associated with the plurality of cloud resources in order to detect compliance or misconfiguration of the plurality of cloud resources forming the cloud architecture, and a resource property discovery component configured to obtain at least threat intelligence gathered by a cloud provider associated with the customer cloud environment and to supplement the metadata associated with the first cloud resource with threat intelligence pertaining to the first cloud resource to be added to the metadata pertaining to the first cloud resource for storage within the storage subsystem, wherein the cloud resource enumeration component, the activity metric collection component, the resource property discovery component, and the enrichment metrics collection component (i) operate to identify misconfiguration of the cloud architecture and any of the plurality of cloud resources forming the cloud architecture and (ii) are implemented with i) electronic circuits, ii) as software stored in one or more non-transitory computer storage mediums and executed by one or more processors, and iii) any combination of i) or ii).

13. The cyber security system of claim 12, wherein the cloud resource enumeration component is configured to collect metadata by (i) conducting access mapping to identify one or more communication paths between at least the first cloud resource and one or more cloud resources of the plurality of cloud resources other than the first cloud resource, (ii) conducting network mapping to identify one or more network paths between the first cloud resource operating as a network-based cloud resources, and (ii) adding information associated with the one or more communication paths and the one or more network paths to the metadata pertaining to the first cloud resource for storage within the storage subsystem.

14. The cyber security system of claim 12, wherein the resource property discovery component is further configured to obtain information associated with the first cloud resource being a logical data store of the plurality of cloud resources, and thereafter, determine whether the first cloud resource include sensitive information and add an indicator of a presence of sensitive information within the first cloud resource to the metadata pertaining to the first cloud resource for storage within the storage subsystem.

15. The cyber security system of claim 14, wherein the resource property discovery component is further configured to obtain metadata associated with the plurality of cloud resources to determine whether any of the plurality of cloud resources possesses vulnerabilities.

16. The cyber security system of claim 12, wherein the enrichment metrics collection component is further configured to perform Kubernetes security posture management (KSPM) to determine compliance or misconfiguration of a cloud resource of the plurality of cloud resources being part of a Kubernetes environment within the customer cloud environment.

17. The cyber security system of claim 12, wherein the activity metric collection component is further configured to perform cost analytics as to costs associated with at least the first cloud resource of the plurality of cloud resources and the cloud architecture of one or more cloud architectures.

18. The cyber security system of claim 12 further comprising:

an architecture creation component configured with (i) node creation logic to generate node constructs for each of the plurality of cloud resources based on metadata corresponding to each of the plurality of cloud resources, (ii) edge creation logic is configured to generate edge constructs for each communicatively coupled node pair, and (iii) architectural build logic configured to generate at least a cloud architecture construct based on the node constructs and the edge constructs, wherein the cloud architecture construct is a code-based representation of the cloud architecture of one or more cloud architectures.

19. The cyber security system of claim 18 further comprising:

an architecture rendering component operating with a user interface to render one or more cloud architectures including the cloud architecture, wherein the architecture creation component further comprises interactive element generation logic configured to generate constructs associated with interactive graphical display elements that, when rendered by operations performed by the architecture rendering component and the user interface and upon selection of an interactive graphical display element being a graphical node produced from a node construct of the node constructs or a graphical edge produced by an edge construct of the edge constructs, causes rendering of metrics associated with the interactive graphical display element.

20. A computerized method performed by execution of one or more instructions by one or more processor in which the one or more instructions are stored in a non-transitory storage medium, the computerized method comprising:

identifying a plurality of cloud resources within a customer cloud environment;

collecting metadata associated with each of the plurality of cloud resources including a first cloud resource for storage within a storage subsystem, wherein the metadata associated with the first cloud resource includes (i) a resource name, (ii) an identifier within the customer cloud environment, (iii) a cloud account identifier, (iv) a resource type parameter, (v) a location parameter, and (vi) supplemental metadata including (a) metadata associated with one or more user profiles utilizing the first cloud resource, (b) metadata associated with user roles, and (c) metadata associated with a detected misconfiguration for the first cloud resource;

obtaining at least threat intelligence gathered by a cloud provider associated with the customer cloud environment and to supplement the metadata associated with at least the first cloud resource with threat intelligence pertaining to the first cloud resource to be added to the metadata pertaining to the first cloud resource for storage within the storage subsystem; and generating one or more cloud architectures based on the metadata associated with the plurality of cloud resources including at least the first cloud resource.

21. A non-transitory storage medium including software that, upon execution by a processor, generates a cloud architecture assembled from metadata associated with a plurality of cloud resources within a customer cloud environment, the software comprising:

a cloud resource enumeration component, upon execution by the processor, configured to (i) identify the plurality of cloud resources and (ii) collect metadata associated with each of the plurality of cloud resources including a first cloud resource for storage within a storage subsystem;

an activity metric collection component, upon execution by the processor, configured to determine how at least the first cloud resource of the plurality of cloud resources is behaving within the customer cloud environment based on analytics conducted on log data and network traffic data associated with the first cloud resource;

an enrichment metrics collection component, upon execution by the processor, configured to conduct analytics on information associated with the plurality of cloud resources in order to detect compliance or misconfiguration of the plurality of cloud resources forming the cloud architecture; and a resource property discovery component, upon execution by the processor, configured to obtain at least threat intelligence gathered by a cloud provider associated with the customer cloud environment and to supplement the metadata associated with the first cloud resource with threat intelligence pertaining to the first cloud resource to be added to the metadata pertaining to the first cloud resource for storage within the storage subsystem.

* * * * *